(12) United States Patent
Bristol

(10) Patent No.: US 8,893,937 B1
(45) Date of Patent: Nov. 25, 2014

(54) MULTIPLE MODE PORTABLE WHEELED BACKPACK

(76) Inventor: Jared D. Bristol, Pocatello, ID (US)

(*) Notice: Subject to any disclaimer, the term of this patent is extended or adjusted under 35 U.S.C. 154(b) by 74 days.

(21) Appl. No.: 13/537,041

(22) Filed: Jun. 28, 2012

Related U.S. Application Data

(60) Provisional application No. 61/502,122, filed on Jun. 28, 2011.

(51) Int. Cl.
*A45C 5/14* (2006.01)
*B62B 5/06* (2006.01)

(52) U.S. Cl.
CPC ...................................... *B62B 5/068* (2013.01)
USPC ............................. 224/153; 224/184; 224/576

(58) Field of Classification Search
CPC .. B62B 5/068; B62K 3/002; A45C 2009/005; A45C 5/14; A45C 9/00
USPC ......... 224/576, 153, 184, 644, 651, 652, 653, 224/660; 280/1.5, 30, 37, 18, 87.041; 180/208
See application file for complete search history.

(56) References Cited

U.S. PATENT DOCUMENTS

| | | | | |
|---|---|---|---|---|
| 3,550,997 A | * | 12/1970 | Strand | 280/30 |
| 4,045,040 A | * | 8/1977 | Fails | 280/1.5 |
| 4,664,395 A | * | 5/1987 | McCoy | 280/1.5 |
| 4,913,252 A | * | 4/1990 | Bartley et al. | 180/208 |
| 5,184,763 A | | 2/1993 | Blaisdell et al. | |
| 5,385,355 A | | 1/1995 | Hoffman | |
| 5,460,307 A | | 10/1995 | Stevenson | |
| 5,474,278 A | | 12/1995 | Cleveland | |
| 5,769,431 A | * | 6/1998 | Cordova | 280/1.5 |
| 6,460,866 B1 | * | 10/2002 | Altschul et al. | 280/30 |
| 7,066,311 B2 | | 6/2006 | O'Shea | |
| 7,322,452 B2 | | 1/2008 | Nykoluk | |
| 7,431,311 B2 | | 10/2008 | Turner et al. | |
| 7,731,204 B2 | | 6/2010 | Turner et al. | |
| 8,282,113 B2 | * | 10/2012 | Veal et al. | 280/87.041 |
| 2004/0056442 A1 | * | 3/2004 | Ostrowski et al. | 280/87.041 |
| 2007/0075105 A1 | * | 4/2007 | Petrin | 224/153 |
| 2009/0079144 A1 | * | 3/2009 | Satorius | 280/1.5 |
| 2009/0159622 A1 | | 6/2009 | Smith | |
| 2011/0193304 A1 | * | 8/2011 | Turner et al. | 280/37 |
| 2013/0033012 A1 | * | 2/2013 | Arjomand et al. | 280/7.17 |

* cited by examiner

*Primary Examiner* — Brian D Nash
*Assistant Examiner* — Corey Skurdal

(57) ABSTRACT

In one embodiment of the invention, a multiple mode portable wheeled backpack includes: a backpack section and an extended trailing section that is removably coupled to the backpack section, wherein the extended trailing section includes a plurality of wheels.

10 Claims, 27 Drawing Sheets

MULTIPLE MODE PORTABLE WHEELED BACKPACK

CROSS-REFERENCE TO RELATED APPLICATION

This application claims a priority to and claims the benefit of U.S. Provisional Application No. 61/502,122, filed on Jun. 28, 2011. U.S. Provisional Application No. 61/502,122 is hereby incorporated herein by reference.

TECHNICAL FIELD

Embodiments of the invention relate generally to a multiple mode portable wheeled backpack.

BACKGROUND

Backpacks are commonly used in outdoor activities such as, for example, camping, hiking, fishing and hunting, and/or other outdoor activities. Additionally, backpacks are used for other outdoor activities that relate to non-sporting activities such as, for example, army or military exercises or campaigns, scientific expeditions, and/or survivalist outdoor exercises. However, conventional backpacks do not relieve stress on the back of the backpack user when heavy items are stored in the backpack. As a result, backpacks that are filled with heavy items do not typically permit the backpack user to go on longer and/or deeper expeditions in the wilderness or remote areas.

Additionally, a backpack is very limited and/or disadvantageous for storing items (e.g., game and/or fishes) that are obtained in certain outdoor sporting activities such as, for example, hunting and/or fishing. Furthermore, in other outdoor activities such as, for example, camping, a backpack is unable to store many necessary items needed in these outdoor activities. Therefore, conventional backpacks prevent outdoor sportsmen from going into deep expedition in the woods, wilderness, or remote areas because they are unable to haul sufficient resources in the backpacks.

Conventional backpacks are also not configurable for storing and carrying large-size items. Therefore, a backpack user suffers from the inconvenience of being unable to conveniently transport large-size items.

Based on the above discussion, the current technology is limited in its capabilities and suffers from at least the above constraints and deficiencies.

SUMMARY

In one embodiment of the invention, a multiple mode portable wheeled backpack includes: a backpack section and an extended trailing section that is removably coupled to the backpack section, wherein the extended trailing section includes a plurality of wheels.

In another embodiment of the invention, a multiple mode portable wheeled backpack includes: means for a backpack section, and means for an extended trailing section that is removably coupled to the means for a backpack section, wherein the means for an extended trailing section includes a plurality of wheels.

In yet another embodiment of the invention, a quick release coupler includes various components to be discussed below in additional details.

In yet another embodiment of the invention, a method of assembling a multiple mode portable wheeled backpack includes: forming a backpack section, forming an extended trailing section including attaching wheels to the extended trailing section, and forming a plurality of couplers wherein the plurality of couplers are configured to removably couple the extended trailing section to the backpack section.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Additionally, the left-most digit of a reference number may identify the drawing in which the reference number first appears.

DETAILED DESCRIPTION OF PREFERRED EMBODIMENTS

Figure 1:
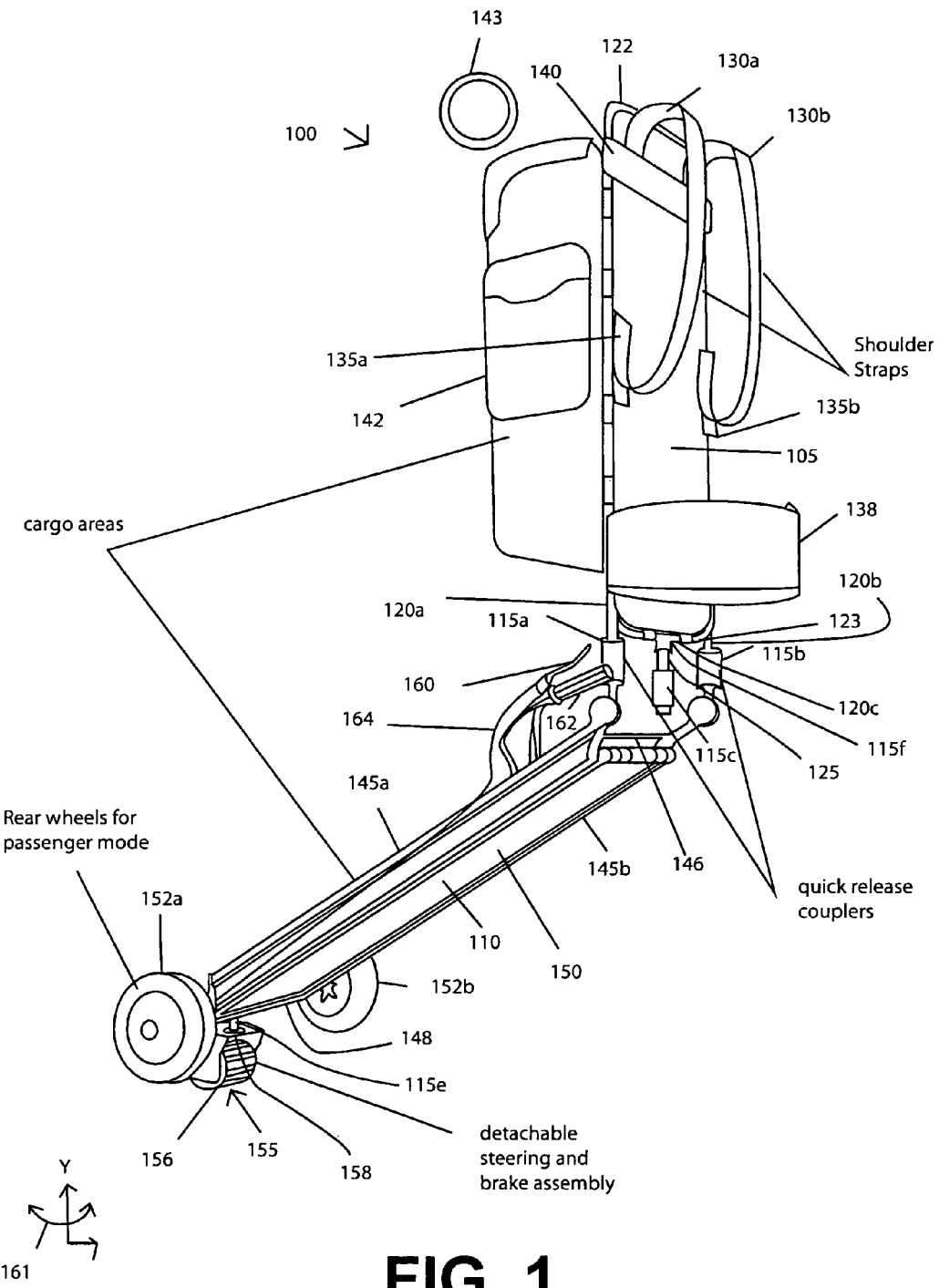
FIG. 1 is a block diagram of a multiple mode portable wheeled backpack configured in a first mode, in accordance with an embodiment of the invention.

In the description herein, numerous specific details are provided, such as examples of components, materials, parts, structures, and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, structures, and/or the like. In other instances, well-known components, materials, parts, structures, methods, or operations are not shown or described in detail to avoid obscuring aspects of embodiments of the invention. Additionally, the figures are representative in nature and their shapes are not intended to illustrate the precise shape or precise size of any element and are not intended to limit the scope of the invention.

Those skilled in the art will understand that when an element or part in the drawings is referred to as being "on" (or "connected" to or "coupled" to or "attached" to) another element, it can be directly on (or directly attached to) the other element or intervening elements may also be present. Furthermore, relative terms such as "inner", "outer", "upper", "above", "lower", "beneath", "below", "downward", and "upward" and similar terms, may be used herein to describe a relationship of one element relative to another element. It is understood that these terms are intended to encompass different orientations of the device in addition to the orientation depicted in the figures.

Although the terms first, second, and the like may be used herein to describe various elements, components, parts, regions, layers, chambers, and/or sections, these elements, components, parts, regions, layers, chambers, and/or sections should not be limited by these terms. These terms are only used to distinguish one element, component, part, region, layer, chamber, or section from another element, component, part, region, layer, chamber, or section. Thus, a first element, component, part, region, layer, chamber, or section discussed below could be termed a second element, component, part, region, layer, chamber, or section without departing from the teachings of the present invention.

Embodiments of the invention are described herein with reference to cross-sectional view illustrations (or transparent view illustrations) that are schematic illustrations of representative embodiments of the invention. As such, variations from the shapes of the illustrations as a result of, for example, manufacturing techniques and/or tolerances are expected. Embodiments of the invention should not be construed as limited to the particular shapes of the regions, elements, components, parts, layers, chambers, and/or sections illustrated herein but are to include deviations in shapes that result, for example, from manufacturing or particular implementations. For example, an element illustrated or described as square or rectangular may typically have rounded or curved features due to normal manufacturing tolerances or due to a particular implementation. Thus, the elements illustrated in the figures are schematic in nature and their shapes are not intended to illustrate the precise shape of an element of a device and are not intended to limit the scope of the invention.

Based on the discussion of the embodiments of the invention as presented herein, those skilled in the art will realize that the positions and/or configurations of the components in the drawings can be varied in different sizes, different shapes, different positions, and/or different configurations. Therefore, various components shown in the drawings can be placed in other positions that differ from the configuration as shown in the drawings. The components in the drawings are illustrated in non-limiting example positions for purposes of explaining the functionalities of the embodiments of the invention, and these components in the drawings can be configured into other example positions.

Figure 2:
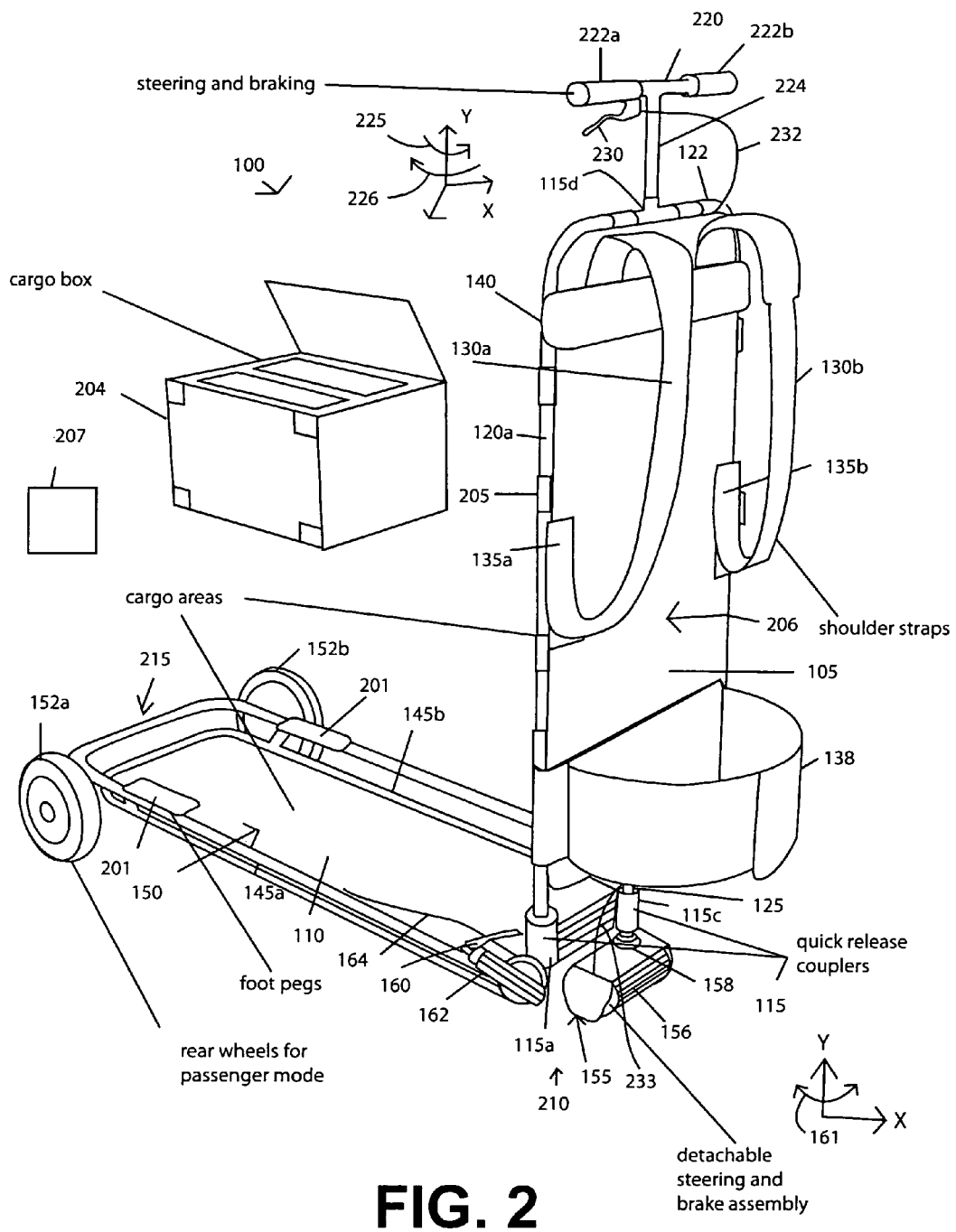
FIG. 2 is a block diagram of a multiple mode portable wheeled backpack configured in a second mode, in accordance with an embodiment of the invention.
Figure 4:
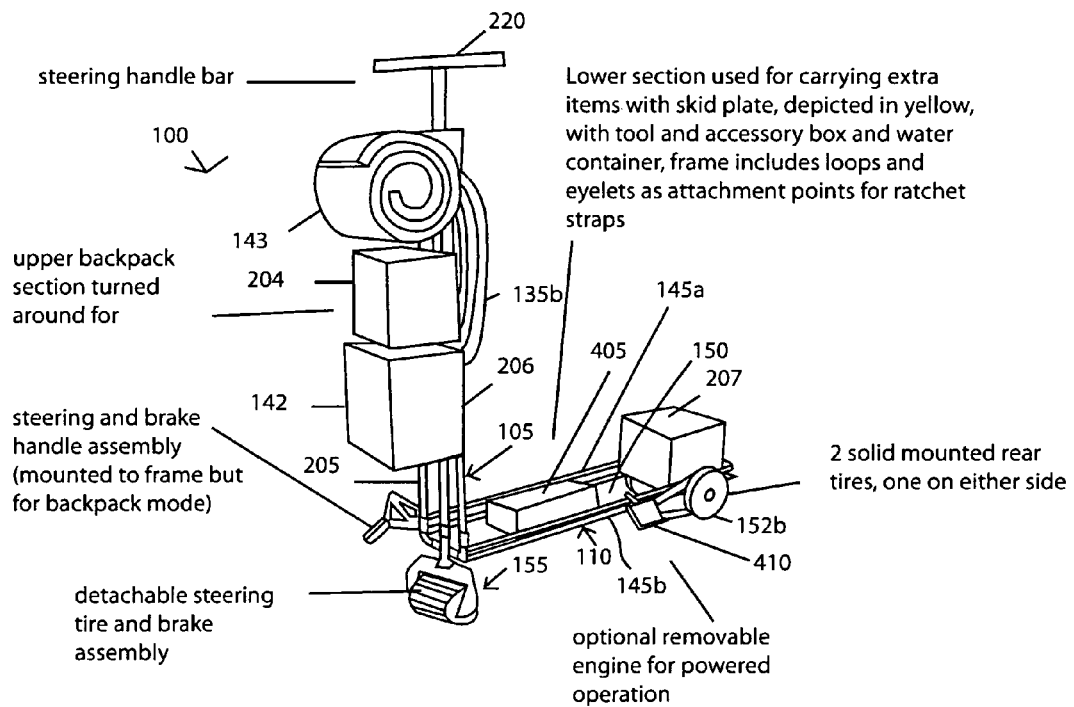
FIG. 4 is a block diagram of a multiple mode portable wheeled backpack configured in a third mode, in accordance with an embodiment of the invention.
Figure 5A:
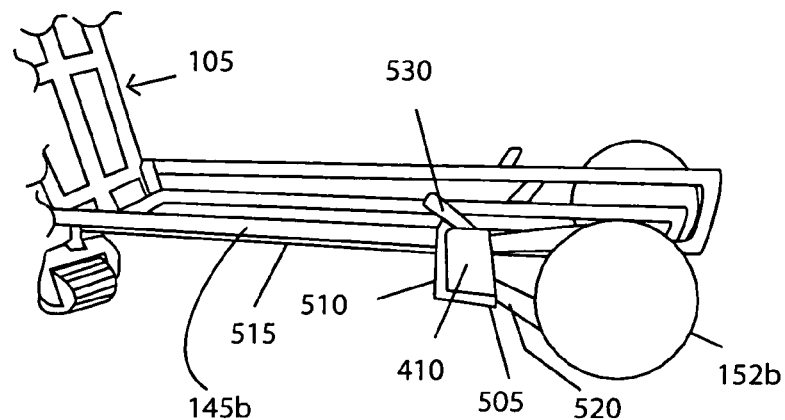
FIGS. 5a, 5b, 5c, and 5d are block diagrams of a multiple mode portable wheeled backpack also configured in a third mode, in accordance with an embodiment of the invention.
Figure 5B:
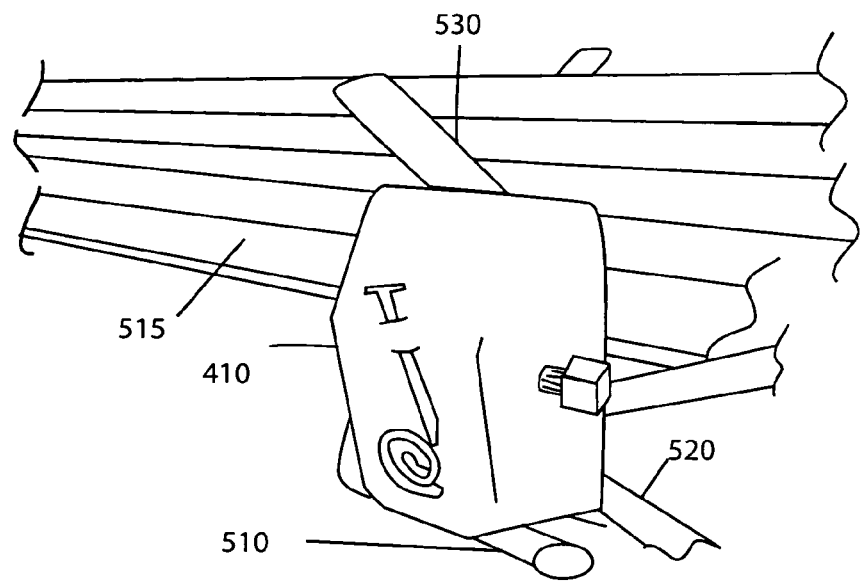
Figure 5C:
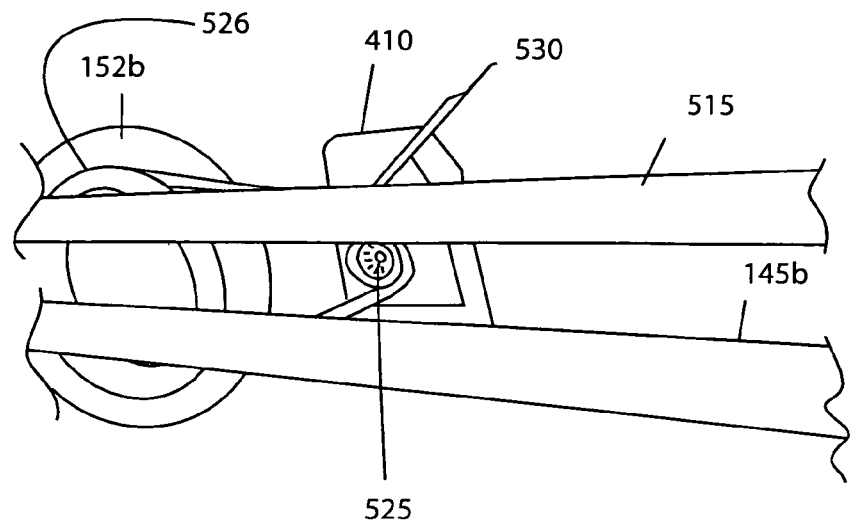
Figure 5D:
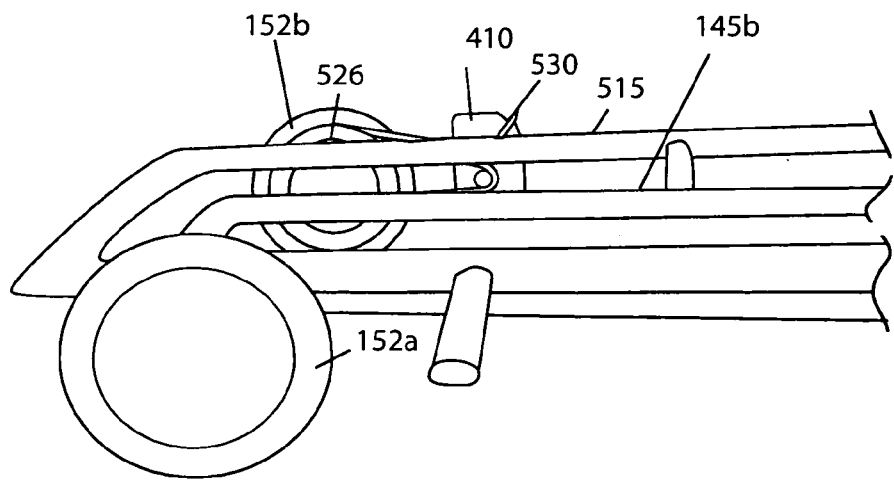

FIG. 1 is a block diagram of a multiple mode portable wheeled backpack 100 configured in a first mode (the "backpack mode", "backpack trailing mode", or "dragging mode"), in accordance with an embodiment of the invention. The multiple mode portable wheeled backpack 100 can be configured in a plurality of modes by use of modular components that can be varied, adjusted, and/or coupled together, as will be discussed below. For example, the multiple mode portable wheeled backpack 100 can be configured in the first mode (which is a backpack mode (i.e., backpack trailing mode) with a backpack section 105 and an extended trailing section 110 removably coupled to the backpack section 105, as shown in FIG. 1), or in a second mode (the "passenger mode" or "scooter mode" as shown in FIG. 2) in accordance with an embodiment of the invention. As another example, the portable wheeled backpack 100 can be configured in a third mode (the "motorized mode" or "scooter mode" as shown in FIG. 4) where the portable wheeled backpack 100 has motorized-capability, scooter-capability, or motor-powered capability as will be discussed below in accordance with an embodiment of the invention.

As an example, the portable wheeled backpack 100 is a multiplatform and modular utility device that can haul, for example, at least or over 100 pounds of cargo. Therefore, the portable wheeled backpack 100 provides a revolutionary system that extends and enhances the outdoor adventure and allows avid outdoorsmen and women, hunters, survivalists, military personnel, and/or other individuals to go further on outdoor expeditions and engage in the expeditions for a longer time period. Additionally, the portable wheeled backpack 100 advantageously relieves the weight on the back and shoulders of the users and advantageously relieves strenuous pressure of heavy weight items to be hauled. The backpack 100 can also advantageously glide smoothly along paths no matter how extreme the off-road adventure may be for a user of the backpack 100.

The backpack 100 advantageously provides a flexible and durable system that can haul various essential items such as, for example, a tent, camp chair, lantern, cooler, water containers, sleeping bags, tools, cargo containers, and/or other items. With continuing reference to FIG. 1, the multiple mode portable wheeled backpack 100 includes the two modular components which are the backpack section 105 and the extended trailing section 110. The extended trailing section 110 is removably coupled to the backpack section 105 by a plurality of couplers 115. Two components are removably coupled (or removably attached or removably secured) means that two different components can be attached together or detached apart. Therefore, the couplers 115 permit the backpack section 105 and the extended trailing section 110 to be coupled together and to be separated apart.

In an embodiment of the invention, the number of the couplers 115 may vary. In an exemplary multiple mode portable wheeled backpack 100 shown in FIG. 1, the couplers 115 are shown as the couplers 115a, 115b, and 115c. The coupler 115c is not used in the first mode (i.e., the "backpack mode") but is used in the second mode (i.e., the "passenger mode") and in the third mode (i.e., the "scooter mode"). The couplers 115 may be quick connectors that permit the user to rapidly transform the portable wheeled backpack 100 from one mode to another mode in a convenient and flexible manner. Various examples of suitable couplers 115 will be discussed below.

In contrast, conventional backpacks do not provide any features that permit the backpacks to be modular and/or to be transformed in other configurations or modes in a convenient and flexible manner.

In one embodiment, the backpack section 105 includes a first vertical frame member 120a and a second vertical frame member 120b. The members 120a and 120b are at least substantially parallel to each other and may typically be connected by a top frame member 122 which is between the members 120a and 120b. A third frame member 120c (horizontal bottom member 120c) is typically disposed between and connected to the members 120a and 120b and is opposite of the top frame member 122. The third frame member 120 is at the bottom portion of the backpack section 105 and near the extended trailing section 110. The top frame member 122 is at the top portion of the backpack section 105 and is farther from the extended trailing section 110. An extension member 125 is coupled to the third frame member 120c and to the coupler 115c.

The first shoulder strap 130a and the second shoulder strap 130b can be removably coupled to the first frame member 120a and the second frame member 120b, respectively. As will also be discussed below, the straps 130a and 130b can be varied in configuration. For example, the straps 130a and 130b can be wider in size (or can be vest-shaped straps) in order to ease the stress applied by the straps 130a and 130b to the shoulder of the user of the portable wheeled backpack 100.

In an embodiment, a first strap connector 135a and a second strap connector 135b are coupled to the first frame 120a and the second frame 120b, respectively. The straps 130a and 130b are coupled to a pad 140 which is coupled to both of the frames 120a and 120b. The straps 130a and 130b are then coupled to the first strap connector 135a and second strap connector 135b, respectively. The user of the multiple mode portable wheeled backpack 100 can insert her/his arms through the straps 135a and 135b and mount these straps on his/her shoulders for backpacking and can, therefore, mount the backpack section 105 on his/her back and shoulder in the same manner as a conventional backpack.

Additionally or optionally, a belt strap 138 may be coupled to the frames 120a and 120b. This belt strap 138 is wrapped around the waist area of a user of the portable wheeled backpack 100.

A cargo pack 142 can be coupled to the backpack section 105. Specifically, the cargo pack 142 can be coupled to the frame members 120a and 120b and can function as a backpack cargo area for storing suitable items. The size of a cargo pack 142 may vary and is typically the same size as any sizes of any cargo pack of a conventional backpack. When the user removes and separates the extended trailing section 110 from the backpack section 105 by removing the extended trailing section 110 from the couplers 115a and 115b, the user can wear or carry the backpack section 105 in the same manner as a conventional backpack. Therefore, an embodiment of the multiple mode portable wheeled backpack 100 has the flexibility of being quickly transformed into a conventional backpack and being quickly transformed into the backpack mode of FIG. 1, or into the passenger mode of FIG. 2 or the scooter mode of FIG. 4.

The cargo pack 142 can be, for example, formed from a nylon type material and may have multiple separate components. Additionally, a rolled sleeping bag 143 may also be mounted on the backpack section 105 by use of suitable connectors, hooks, chords, or other coupling mechanisms.

In an embodiment of the invention, the extended trailing section 110 includes the first frame member 145a and the second frame member 145b which is at least substantially parallel to the first frame member 145a. The members 145a and 145b are removably coupled to and can be separated from the couplers 115a and 115b, respectively. Therefore, the extended trailing section 110 can be removably coupled to the backpack section 105 by removably coupling the members 145a and 145b to the couplers 115a and 115b, respectively. The extended trailing section 110 can be separated from the backpack section 105 by separating the members 145a and 145b from the couplers 115a and 115b, respectively.

In an embodiment, the extended trailing section 110 (i.e., extended trailing unit 110) includes a front frame member 146 between the members 145a and 145b, and a rear frame member 148 between the members 145a and 145b. The front frame member 146 is near the couplers 115a and 115b and is located opposite from the rear frame member 148 of the trailing section 110.

In an embodiment, the extended trailing section 110 also includes a cargo floor 150 on which items can be placed. The cargo floor 150 is between the frame members 145a and 145b.

In an embodiment, the extended trailing section 110 also includes the rear primary wheel 156 which is coupled to the rear frame member 148 (and/or is adjacent to the rear frame member 148 and is otherwise coupled to a suitable part of the extended trailing section 110). The wheel 156 can turn or steer in either rotational directions 161 with respect to the vertical y-axis. Therefore, when the user straps on the backpack section 105 via the straps 130a and 130b and/or belt 138, the rear primary wheel 156 permits the user to also drag the extended trailing section 110 that is removably coupled to the backpack section 105. As a result, the user can place extra items or heavy items on the floor 150 while also placing other items in the backpack cargo area 142 and the user can conveniently transport all of these items by strapping on the backpack section 105 on his/her back in the same manner as a conventional backpack and dragging the movable extended trailing section 110. In contrast, the trailing section 110 also includes the right auxiliary wheel 152a and left auxiliary wheel 152b which are coupled to the right frame 145a and left frame 145b, respectively. In the backpack trailing mode, only the main rear wheel 156 is contacting the ground as the user is dragging the trailing section 110. Also, in the backpack trailing mode, the wheels 152a and 152b would only assist the trailing section 110 when this section is, for example, travelling over an obstructing object on the ground such as a log or another object. In the scooter mode as shown in FIGS. 2, 3, 4, and 5a through 5d, the wheels 152a and 152b are contacting the ground and allow the trailing section 110 to travel on the ground because the trailing section 110 is not substantially slanted with respect to a horizontal ground or is not a substantial angle with respect to the horizontal ground and because the brake assembly 155 (with the wheel 156) is moved to the front of the trailing section 110 and is coupled to the coupler 115c (FIG. 1).

In an embodiment of the invention, a detachable steering and brake assembly 155 (i.e., wheel and brake assembly unit 155) can be removably coupled to various locations in the multiple mode portable wheeled backpack 100. In the backpack mode shown in FIG. 1, the assembly 155 is removably coupled to the coupler 115e which is, in turn, coupled to the rear frame member 148. The assembly 155 includes a wheel 156 and a component 158. For example, the component 158 is a vertically protruding spline stud shaft 731 out of the top portion 726 of the wheel assembly 155, and the component 158 can also removably lock into place on the unit 115e which would basically be the mounting plate that is fixed to the rear mounting bar 148 (i.e., rear unit bar 148). The unit 115e permits the assembly 155 to pivot and to be steered by the user in various directions. The unit 115e is similar to a turn table on a trackhoe which is the waist part, and the component 158 would protrude through a mounting hole on the unit 115e and latch or lock onto the spline shaft. When the component 158 and unit 115e are separated from each other, the unit 115e stays connected to the rear mounting bar 148 because the unit 115e is typically permanently connected to the rear of the trailing section 110 at the rear unit bar 148 and the component 158 would instead be relocated and removably connected adjacent to the front 146 of the trailing section 110 in the scooter mode (i.e., the component 158 (along with the rest of the assembly 155) would be removably connected to the part 125 in the scooter mode). FIG. 2 shows the component 158 and assembly 155 as being removably connected to the part 125 during the scooter mode.

As a further example, the component 125 would be removably coupled to the bottom frame 123 by a coupler 115f (i.e., a connecting shaft 115f) so that the user can separate the component 125 from the bottom frame 123, so that the component 125 does not protrude far vertically downward, and so that the component does not hit the back of the user during the backpack trailing mode. The bottom frame 123 is between the vertical members 120a and 120b and is opposite to the top frame 122. The component 125 can, for example, be stored in a storage box 204 (along with other components such as, for example, the handle bar 220, member 224, and brake lever 230 that each can also be stored in the storage box 204) during the backpack trailing mode.

In the backpack trailing mode shown in FIG. 1, as similarly discussed above, the wheel 156 is in contact with the ground and the wheels 152a and 152a are not in contact with the ground because the wheels 152a and 152b are vertically above the wheel 156. Therefore, the wheel 156 is rotating and in contact with the ground when the user drags the extended trailing section 110 and the wheels 152a and 152b are not in contact with the ground. In the backpack trailing mode, since the wheels 152a and 152 do not touch a horizontal ground, the assembly 155 provides the main steering function and pivoting function for the trailing section 110 and provides (via the wheel 156) the braking function for the trailing section 110.

In an embodiment of the invention, the assembly 155 also includes a braking capability that can be controlled by the user by use of the hand brake-controller 160 (extended trailing section hand brake 160) and handle 162, and the controller 160 is mechanically coupled to and controls a brake wire 164. Therefore, the extended trailing section hand brake 160 (and extended trailing section hand grip 162) is coupled to the extended trailing section 110. This brake wire 164 is coupled to and controls the braking pressure on the brake mechanism in the assembly 155, and this brake mechanism can stop or slow down the rotation of the wheel 156.

The controller 160 and handle 162 may, for example, be similar to the hand brake-controller and handle in a conventional bicycle handle. However, the controller 160 and handle 162 may be configured in other suitable manners. The brake wire 164 is mechanically coupled to a brake mechanism in the assembly 155 and provides the braking pressure that causes the brake mechanism to apply a brake pressure on the wheel 156 and to stop the rotation of the wheel 156 when the user presses the hand brake-controller 160.

In the first mode (i.e., backpack trailing mode"), the handle 162 and couplers 115a and 115b are near or at least nearly adjacent to the waste of the user. Therefore, when the backpack section 105 is mounted on the back of the user, the user will be able to conveniently reach and hold the handle 162 with his/her right arm (in an exemplary embodiment of the portable wheeled backpack 100 shown in FIG. 1) and easily press the brake controller 160. Therefore, when the user straps on the backpack section 105 on his/her shoulders or top body area (via the shoulder straps 130a and 130b and/or belt 138), the user can grab the controller 160 and handle 162 and press the controller 160 so that the controller 160 will apply a braking pressure on the wheel 156 and will cause the wheel 156 to stop rotating due to the braking pressure. Since the wheel 156 will stop rotating, the stationary wheel 156 provides the braking function of the extended trailing section 110. As will be discussed below, the assembly 155 can be separated from (and detached from) the coupler 115e and can be attached to the coupler 115c during the passenger mode and/or during the scooter mode.

In an embodiment of the invention, the various components in the multiple mode portable wheeled backpack 100 may be formed by any suitable rigid material or semi-rigid material such as, by way of example and not by way of limitation, metal or light-weight alloys (e.g., aluminum and/or titanium), plastic, and/or another suitable synthetic material and/or a combination of at least some of these materials that form various components in the backpack section 105 and extended trailing section 110 of the portable wheeled backpack 100. The materials of the cargo pack 142, straps 130a and 130b, and/or belt 138 may be formed by flexible material such as, for example, nylon or other suitable synthetic materials. The cargo back 142 can also be formed by more rigid materials such as, for example, light-weight plastic or other suitable synthetic materials.

The components in the portable wheeled backpack 100 may be manufactured by standard manufacturing methods known to those skilled in the relevant art(s) such as, by way of example and not by way of limitation, molding, stamping, casting, standard attachments and assembly of individual components, and/or other standard shaping processes of durable materials.

Those skilled in the art will realize, after reading the discussion herein, that other suitable materials or combination of suitable materials can be used for the components in the multiple mode portable wheeled backpack 100. Those skilled in the art will also realize, after reading the discussion herein, that the assembly, manufacture, and/or construction of the components of the portable wheeled backpack 100 may be selectively varied based on cost, ease of manufacturing, or/and other considerations. Additionally, the parts or components in the portable wheeled backpack 100 can be suitably varied or substituted with other parts or components or shapes, as manufacturing and parts technologies improve in the future.

FIG. 2 is a block diagram of a multiple mode portable wheeled backpack 100 configured in a second mode (the "passenger mode"), in accordance with an embodiment of the invention. In an embodiment the invention, the portable wheeled backpack 100 may optionally (or additionally)

include at least one foot peg 201. In the passenger mode, the user of the portable wheeled backpack 100 would place his/her foot on the foot peg 201 and use his/her other foot to push the ground so that the user can move the portable wheeled backpack 100 as if he/she is riding a skateboard or similar moving assembly. Although the foot pegs 201 are shown as single piece shoe-sized platforms in FIG. 2, the foot pegs 201 can have other shapes such as, by way of example and not by way of limitation, longer-length platforms, or platforms that extend away from the frames 145a and 145b, or other shaped platforms.

The user can place (or removably couple) various items on the floor 110 such as, for example, the optional cargo box 204, optional water container 207, and/or other items. Additionally or optionally, the user can also removably couple a backpack cargo container 142 (FIG. 1) or other items (e.g., the cargo box 204) to the rear surface 205 of the backpack section 105, where the rear surface 205 is opposite to the front surface 206 of the backpack section 105. The shoulder straps 130a and 130b and belt 138 are removably coupled to the front surface 206.

In the passenger mode, the detachable steering and brake assembly 155 is removably coupled to the coupler 115c which is coupled near the backpack section 105. Therefore, the wheel 155 is in the front 210 of the portable wheeled backpack 100 and is opposite to the wheels 152a and 152b. Therefore, in the passenger mode, the portable wheeled backpack 100 will have the wheel 155 in the front 210 and the wheels 152a and 152b in the rear 215 of the portable wheeled backpack 100. The portable wheeled backpack 100 will have the front wheel 156 and the rear wheels 152a and 152b to permit the portable wheeled backpack 100 to have passenger movements on the ground when the portable wheeled backpack 100 is configured in the passenger mode.

In the passenger mode, a steering handle 220 includes the grips 222a and 222b. The steering handle 220 includes a vertical member 224 that is removably coupled to the connector 115d. The user can steer the handle 20 in the rotational direction 225 with respect to the vertical y-axis or steer the handle 220 in the rotational direction 226 with respect to the y-axis. The rotational direction 225 is opposite to the rotational direction 226 with respect to the y-axis.

When the handle 220 is removably coupled to the connector 115d, the handle 220 is mechanically coupled to the assembly 155 so that the steering the handle 220 moving in the direction 225 will also move the assembly 155 in the direction 225, and the steering the handle 220 moving in the direction 226 will also move the assembly 155 in the direction 226. Therefore, the handle 220 permits the user to steer the assembly 155 and guide the direction of the portable wheeled backpack 100 in the passenger mode. Therefore, the backpack section steering handle is configured to steer the assembly 155.

In an embodiment, the handle 220 includes a handbrake controller 230 (backpack section hand brake 230) and a brake wire 232 mechanically coupled to and connected to the controller 230. Therefore, the backpack section hand brake 230 (and the backpack section steering handle 220) are removably coupled to the backpack section 105. The brake wire 232 is mechanically coupled, via brake wire 233, to a brake mechanism in the assembly 155 and will cause the braking mechanism to apply the braking pressure that causes the wheel 156 to brake and stop rotating when the user presses the hand brake-controller 230. In the passenger mode, the hand brake controller 160 is disconnected from the steering and brake assembly 155 and is, therefore, non-operating in the passenger mode.

Figure 3:
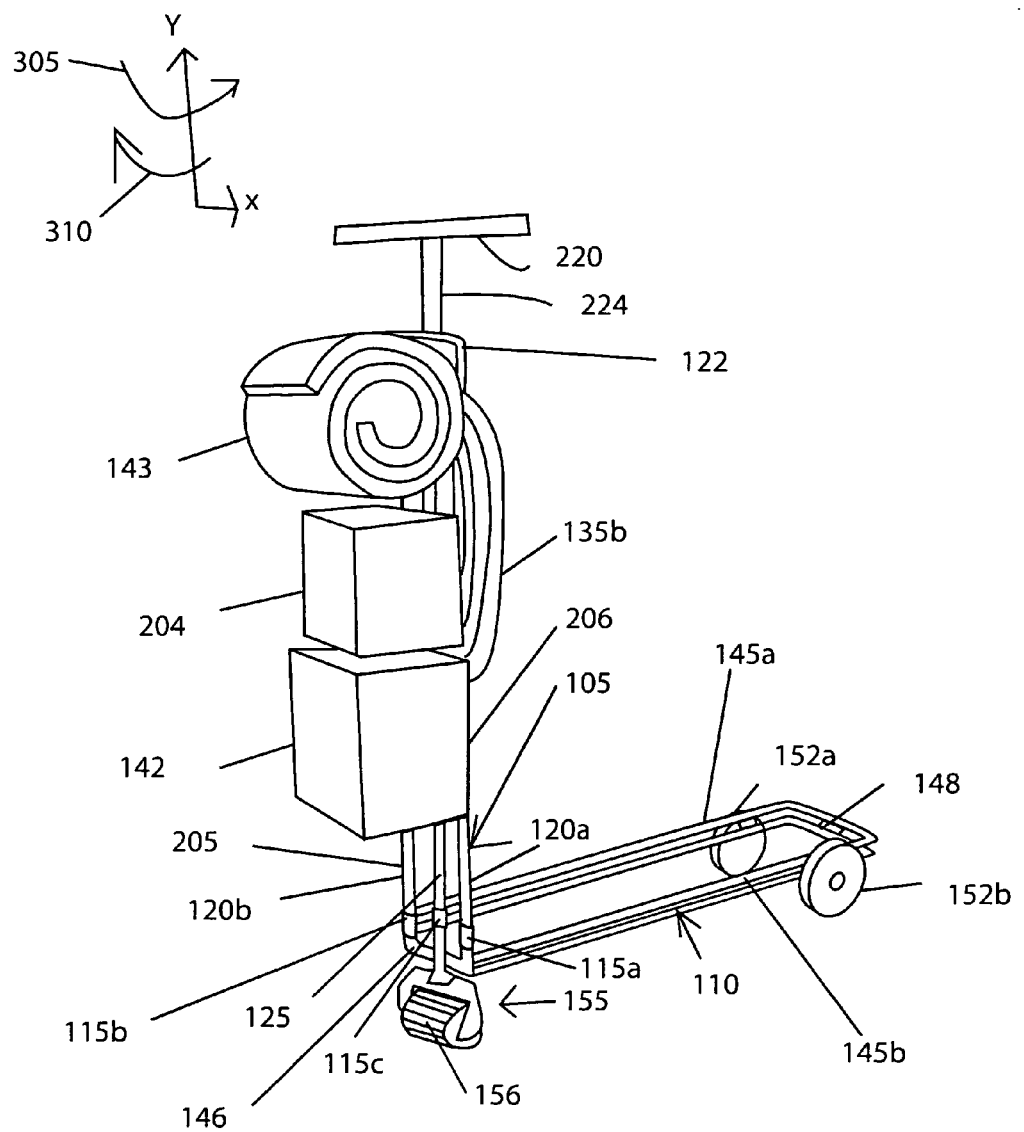
FIG. 3 is a block diagram of a multiple mode portable wheeled backpack also configured in a second mode, in accordance with an embodiment of the invention.

FIG. 3 is a block diagram of a multiple mode portable wheeled backpack 100 also configured in a second mode, in accordance with an embodiment of the invention. The backpack 100 provides removably coupled modular components that provide additional flexible configurations for the user. For example, the connection of the backpack section 105 to the extended trailing section 110 in FIG. 3 is reversed in configuration when compared to the connection of the backpack section 105 to the extended trailing section 110 in FIG. 2. Therefore, in FIG. 3, the frame 120a is removably coupled by the coupler 115a to the frame 145b and the frame 120b is removably coupled by the coupler 115b to the frame 145a. In contrast, in FIG. 2, the frame 120a is removably coupled by the coupler 115a to the frame 145a and the frame 120b is removably coupled by the coupler 115b to the frame 145b. In FIG. 3, the section 205 faces away from the extended trailing section 110 and the section 206 faces toward the extended trailing section 110. In the configuration shown in FIG. 3, the cargo pack 142, cargo box (e.g., tool box) 204, and sleeping back 143 are removably coupled to the surface 205 and are, therefore, facing away from the extended trailing section 110 and from the user who is on the extended trailing section 110 in the passenger mode.

As also shown in FIG. 3, the user can steer the rotation or movement of the handle 220. When the user steers the handle 220 in the rotational direction 305 with respect to the y-axis, the assembly 115 will also steer in the direction 305 in response to steering the handle 220 in the direction 305. When the user steers the handle 220 in the rotational direction 310 with respect to the y-axis, the assembly 115 will also steer in the direction 310 in response to steering the handle 220 in the direction 310. The direction 310 is rotationally directionally opposite to the direction 305.

FIG. 4 is a block diagram of a multiple mode portable wheeled backpack 100 configured in a third mode, in accordance with an embodiment of the invention. The water container 207 is mounted on the surface 150 of the extendable trailing section 110. An accessory box 405 (or tool box 405) may also be mounted on the surface 150 of the extendable trailing section 110. The items (e.g., container 207 and/or box 405) may be removably secured on the surface 150 by use of loops, ratchet straps which are attached through eyelets on the surface 150 or frames 145a and 145b, and/or other attachment mechanisms.

In the third mode (i.e., the motorized mode or scooter mode), an engine 410 is removably coupled to the extended trailing section 110. The engine 410 provides powered operation for rotating one of the wheels (e.g., wheel 152b) so that the wheeled backpack 100 moves by motor power from the engine 410. The engine 410 can be a separate engine kit that is commercially available from various vendors.

FIGS. 5a, 5b, 5c, and 5d are block diagrams of a multiple mode portable wheeled backpack 100 also configured in a third mode, in accordance with an embodiment of the invention. In an embodiment, the engine 410 is in an engine packaging 505 that can be mounted on a mounting plate 510 that is removably attached (or removably clamped) on an upper frame tubing 515 of the extended trailing section 110. Alternatively, the mounting plate can be removably attached to the frame 145b or may be removably attached in a suitable manner on a part of the extended trailing section 110.

The engine 410 can rotate the wheel 152b by rotating the belt 520 which may be a V-belt. As seen on FIGS. 5c and 5d, the engine 410 rotates the engine pulley 525 which moves the belt 520. The V-belt 520 is attached to the wheel pulley 526 of the wheel 152b and rotates the wheel 152b. A stomp metal 530 can be pressed down in order to slide the engine 410 forward to take out any slack out of the belt 520 and cause the engine 410 to drive the wheel 152b. The belt 420 may be a suitable v-belt available from an automotive store. Since the mounting plate 510 can slide forward or backward on the frame tubing 515 before the mounting plate 510 is clamped on the frame tubing 515, different sizes of the belt 420 may be used with the motor 410. The engine pulley 525 is smaller than the wheel pulley 526 which is attached to the wheel 152b. Therefore, the sizes of the pulleys 525 and 526 provide an acceptable or good gear ratio for the small engine to have plenty of leverage and pulling power. The engine 410 is not required to move the portable backpack 100 at a fast speed.

The basic operating procedure and attachment procedure of the motor 410 are, for example, according to the following. The belt 520 is placed on the wheel pulley 526 and motor pulley 525. The engine mounting plate 510 is clamped on the frame tubing 515. A throttle cable assembly can be removably mounted on the handle bar 220. For example, the throttle cable can be controlled by a small lever that can be pushed by a thumb. The engine 410 can be started and a clutch is not needed for the engine 410. The user can step on the foot stomp pad 530 to remove the slack from the belt 520 and hit the level to lever to control the throttle.

Figure 6A:
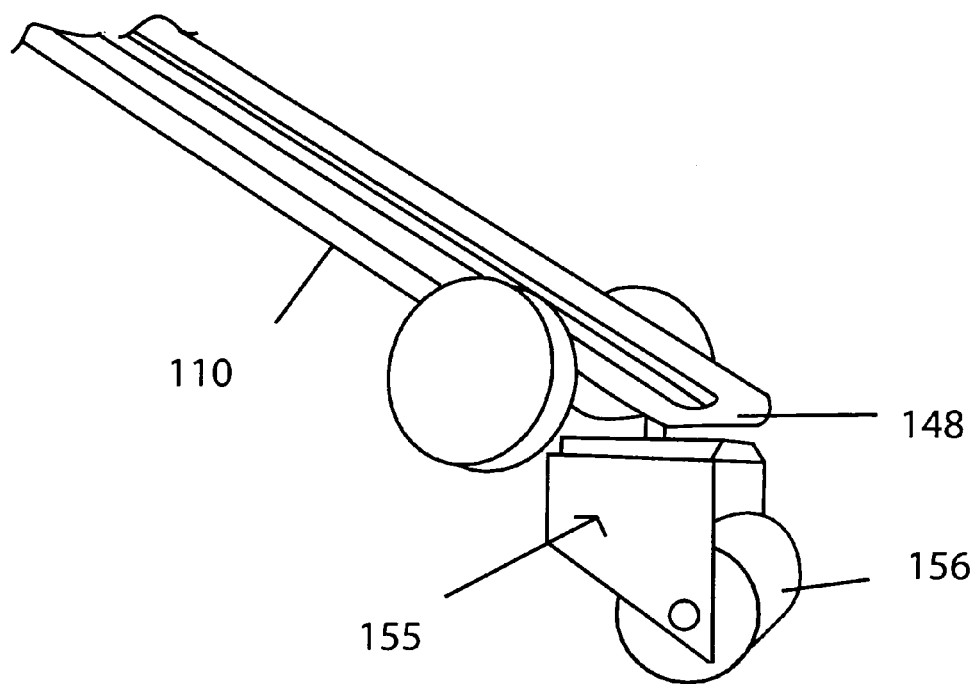
FIG. 6a is a block diagram of a wheel assembly unit removably coupled to the rear frame of trailing section, in accordance with an embodiment of the invention.

FIG. 6a is a block diagram of a wheel assembly unit 155 removably coupled to the rear frame 148 of trailing section 110, in accordance with an embodiment of the invention. The details of an embodiment of the unit 155 will be discussed below.

Figure 6B:
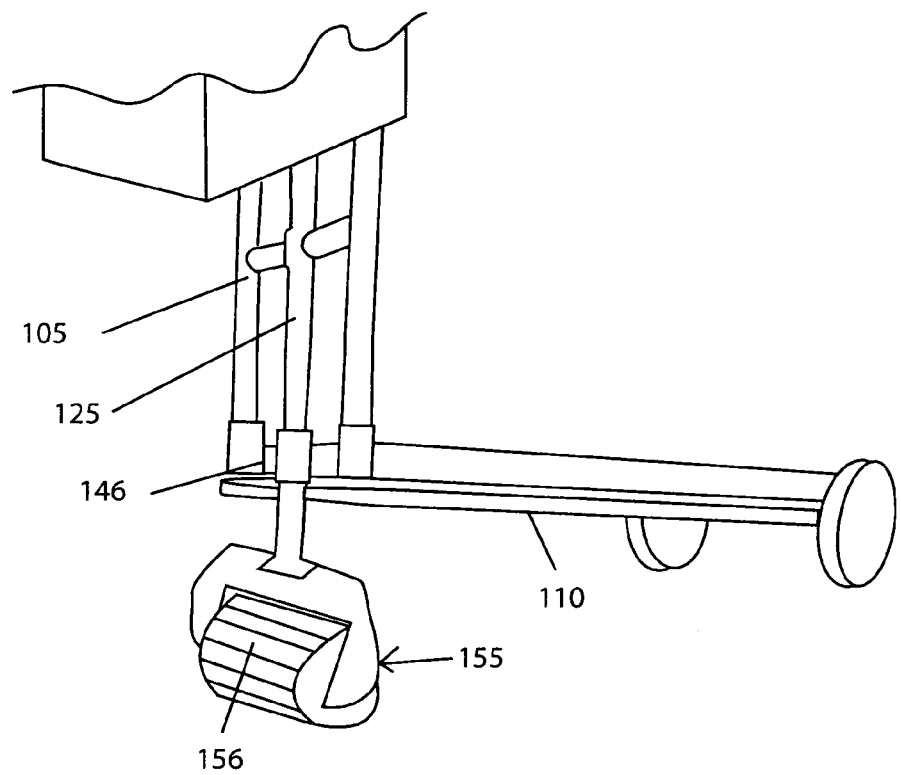
FIG. 6b is a block diagram of a wheel assembly unit removably coupled to the front frame which is adjacent to the front of trailing section, in accordance with another embodiment of the invention.

FIG. 6b is a block diagram of a wheel assembly unit 155 removably coupled to the front frame 125 which is adjacent to the front 146 of trailing section 110, in accordance with another embodiment of the invention. Therefore, the unit 155 can be removably coupled to adjacent to the front 146 during the scooter mode and removably coupled to the rear frame 148 during the backpack trailing mode.

Figure 7A:
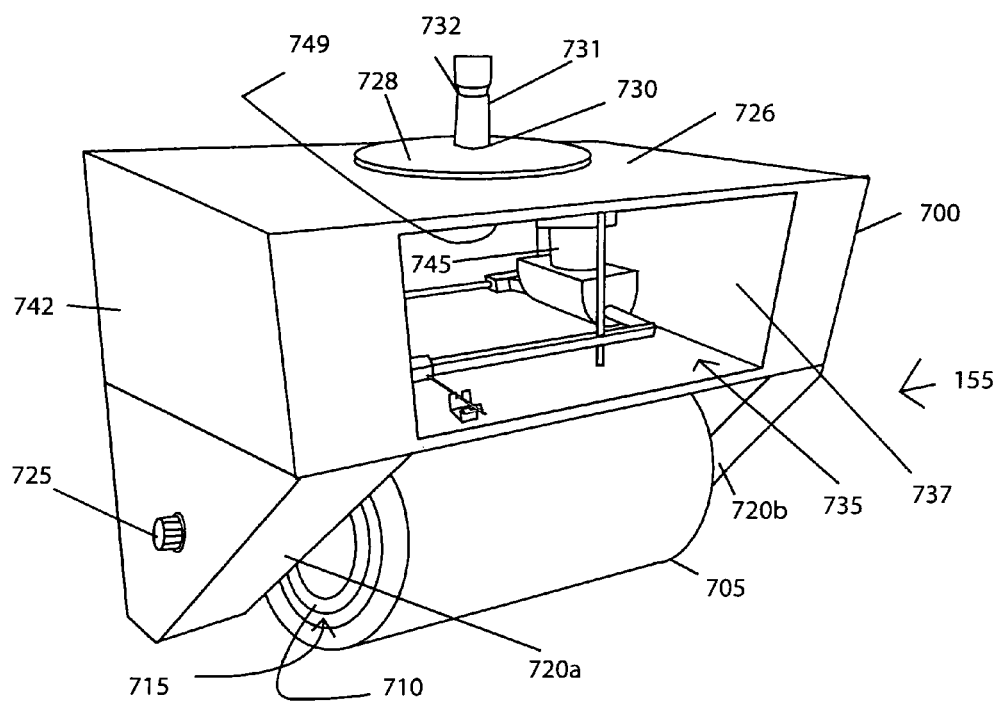
FIG. 7a is a block diagram of a wheel assembly unit, in accordance with an embodiment of the invention.

FIG. 7a is a block diagram of a wheel and brake assembly unit 155, in accordance with an embodiment of the invention. The unit 155 includes a housing 700 which can be a rigid material such as, for example, metal, a metal alloy(s), or another suitable material known to those skilled in the relevant art(s). The unit 155 also includes a wheel 705 (e.g., tire 705) with a built in brake rotor 710. In another embodiment, the unit 155 can instead have two wheels (not shown) that are side-by-side instead of the single wheel 705. The two outer edges of the wheel rim 715 are typically casts a certain way so that the edges become the rotor, or the wheel 705 has mounting points on the wheel 705 so that the rotor brake plating surface 710 is bolted or otherwise attached to the wheel 705. The wheel 705 is inserted between the sides 720a and 720b of the housing 700 with an axle rod 725 disposed through the diameter center of the wheel 705.

The housing 700 preferably supports the weight that is distributed by the trailing section 110 and any object and user weight on the trailing section 110. On the top surface 726 of the housing 700 is a resting plate 728 where a bearing plate (not shown in FIG. 7a) will ride or will be placed on. In the top center 730 of the housing is a spline shaft 731 having a recessed section 732 that is removably coupled to a quick connector during the backpack trailing mode or during the scooter mode. An internal brake system 735 of the unit 155 is seen in the opening 737.

Figure 7B:
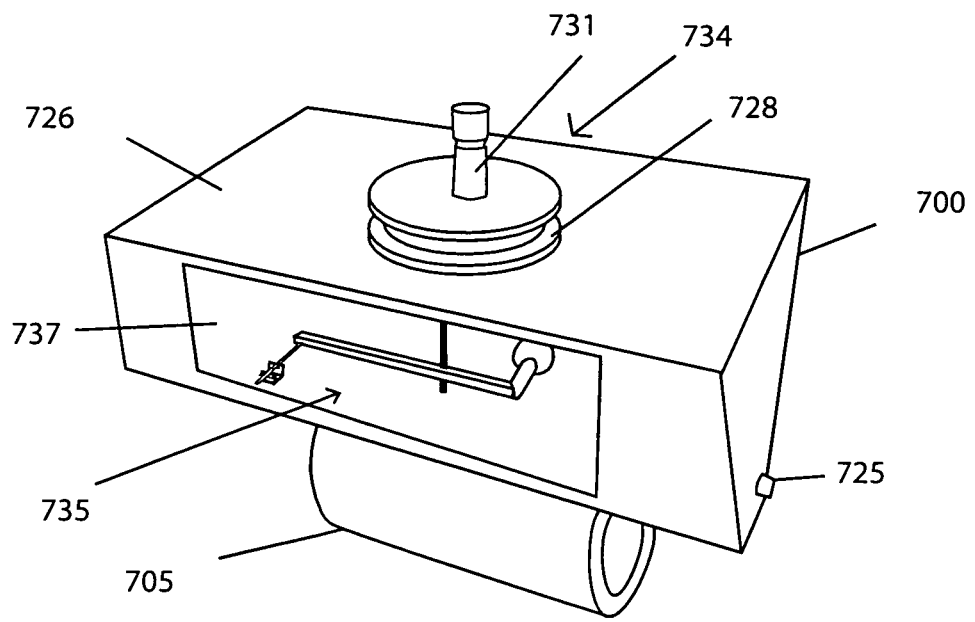
FIG. 7b is a block diagram showing a top view of the bearing plate of a wheel assembly unit, in accordance with an embodiment of the invention.
Figure 7C:
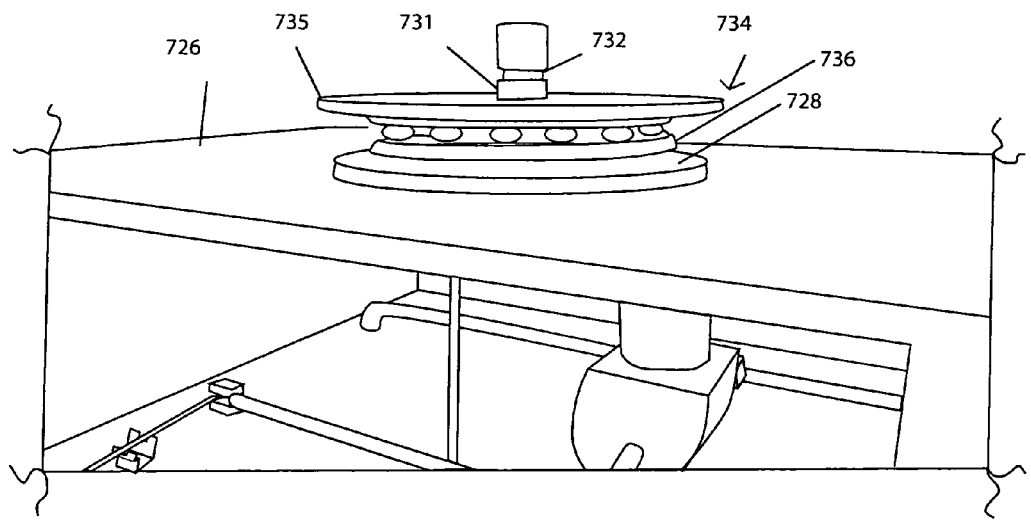
FIG. 7c is a block diagram showing a top view of the bearing plate of a wheel assembly unit, in accordance with an embodiment of the invention.

Reference is now made to FIGS. 7b and 7c. FIG. 7b is a block diagram showing a top view of the bearing plate 734 of the wheel assembly unit 155, in accordance with an embodiment of the invention. In contrast, FIG. 7c is a block diagram showing a top view of the bearing plate 734 of the wheel assembly unit 155, in accordance with an embodiment of the invention. In an embodiment of the invention, the bearing plate 734 is disposed on the plate 728 on the top housing surface 728.

Figure 7D:
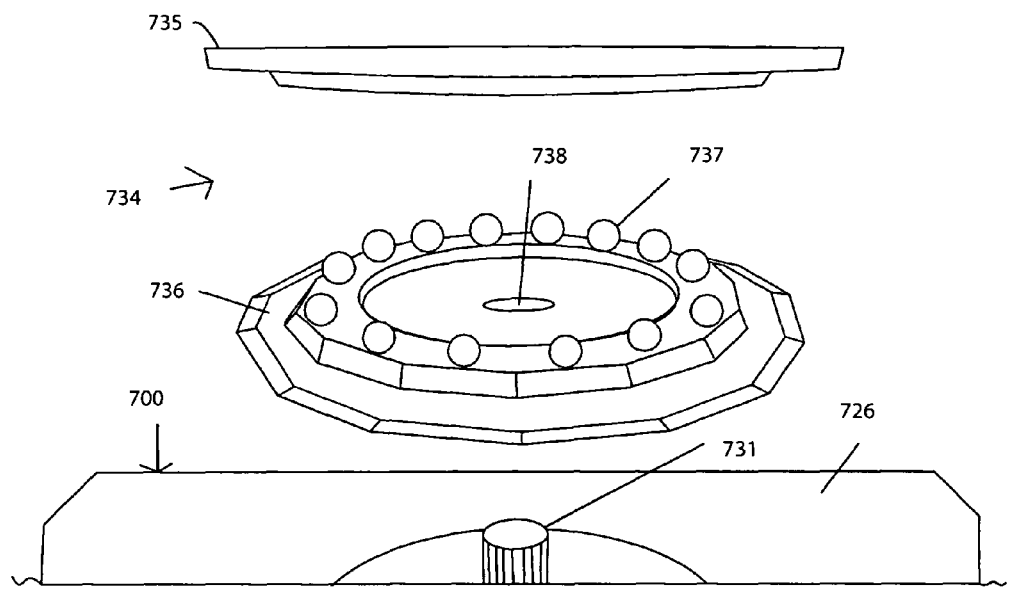
FIG. 7d is a block diagram showing additional details of a bearing plate, in accordance with an embodiment of the invention.

FIG. 7d is a block diagram showing additional details of a bearing plate 734, in accordance with an embodiment of the invention. The bearing plate 734 is shown as separated from the resting plate 728. The upper section 735 is fixed to the rear frame 148 (FIG. 1) of the trailing section 110, and the lower section 736 pivoting with respect to the upper section 735 along the ball bearings 737 between the sections 735 and 736. In an embodiment, the lower section 736 includes mounting points (not shown in FIG. 7d) for cables used for braking ability and for steering ability. Through the centers of the sections 735 and 736 is a hole 738, and the spline shaft 731 is inserted through the hole 738 and is connected to a quick release connector.

Figure 7E:
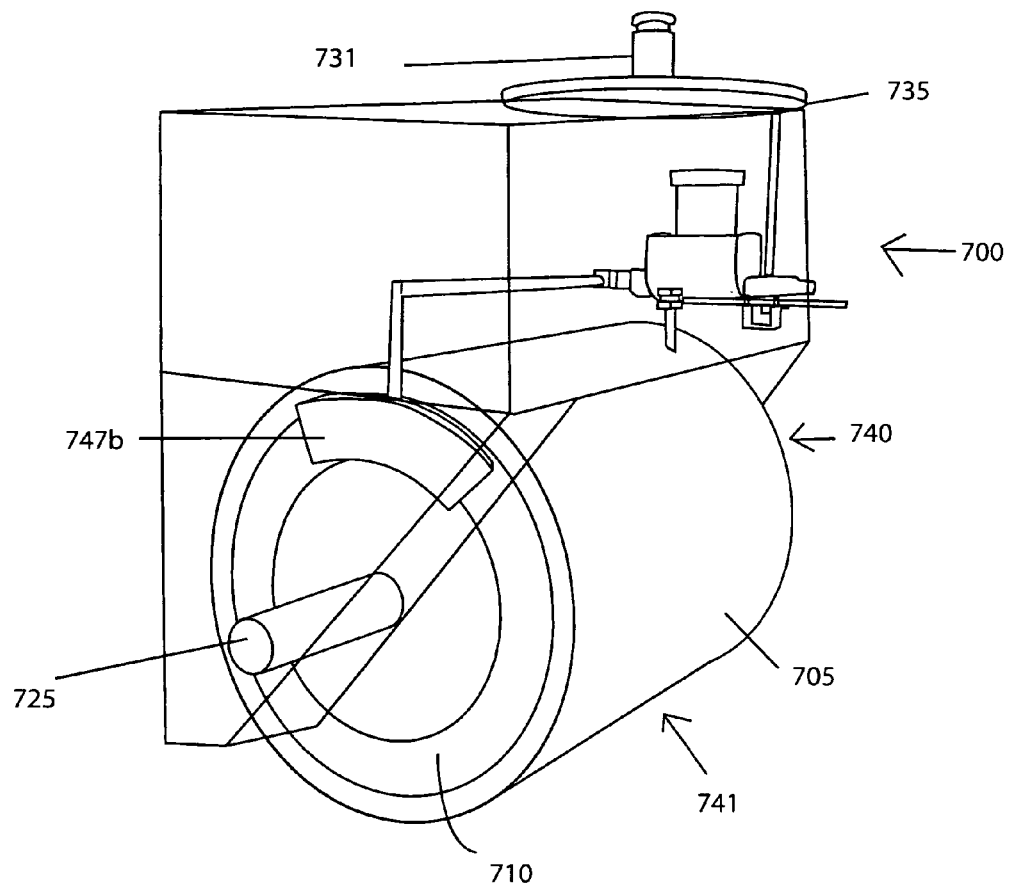
FIG. 7e is a block diagram of a wheel and tire unit, in accordance with an embodiment of the invention.

FIG. 7e is a block diagram of a wheel and tire unit 740, in accordance with an embodiment of the invention. The housing 700 is shown in wireframe format for purposes of ease of discussion of the unit 740. The disc 710 on the edge of the tire 705 is the brake rotor 710, and the axle shaft 725 runs through the center of the wheel 741 and out the sides 742 of the housing 700.

Figure 7F:
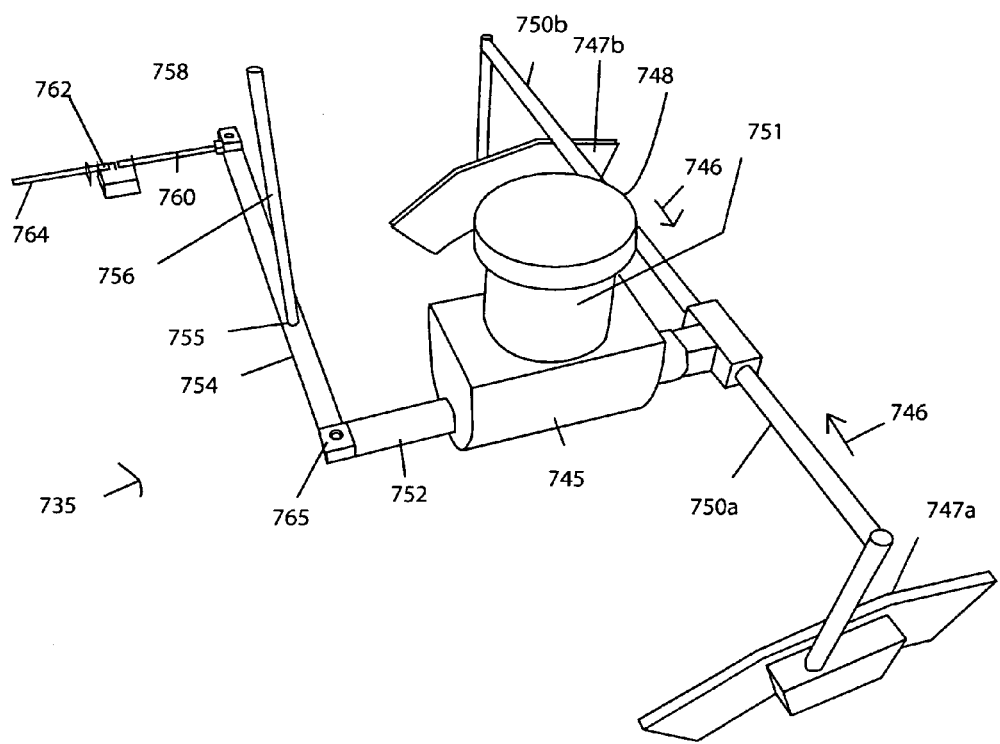
FIG. 7f is a block diagram of a brake system, in accordance with an embodiment of the invention.

FIG. 7f is a block diagram of a brake system 735, in accordance with an embodiment of the invention. In an embodiment, the brake system 735 includes a master cylinder 745 that sends a hydraulic pressure 746 (via hydraulic fluid) to the brake pads 747a and 747b to activate the brake system 735 and permit the pads 747a and 747b to apply the brake pressure to the brake rotors 710. The braking operation of the braking system 735 is similar in operation as standard hydraulic braking systems.

A reservoir 751 is on top of the master cylinder 745. A cylinder top 748 (or lid 748) is on the reservoir 751. The cylinder top 748 is adjacent to the top inner surface 749 of the housing 700. The top inner surface 749 (FIG. 7a) is opposite to the top outer surface 726. The brake slave cylinders 750a and 750b are coupled to the master cylinder 745 and are coupled to the brake pads 747a and 747b, respectively. Therefore, the slave cylinders 750a and 750b are T brake lines 750a and 750b.

The ram 752 (or plunger 752) is coupled to the master cylinder 745 and is depressed (or otherwise moved or actuated) so that the ram 752 is depressed from the master cylinder 745 to provide the hydraulic pressure to actuate the brake system 735 and permit the brake pads 747a and 747b to apply braking pressure to the brake rotors 710.

The leverage bar 754 presses or otherwise moves the ram 752 to actuate the hydraulic pressure to actuate the brake system 735. The center section 755 of the leverage bar 754 is mounted to the pivoting post 756, and an end 758 of the bar 754 is connected to a cable 760 that can be removably connected to a quick release connector 762. In turn, the quick release connector 762 is connected to a cable 764 that runs to a brake actuator that the user can actuate or press in the same manner as a bicycle brake handle so that the user can actuate the brake system 735 to provide the above discussed braking pressure.

As an example, when the unit 155 is connected to the rear frame 148 in the backpack trailing mode as shown in FIG. 1, the cable 764 would be a cable running from the extended trailing section hand brake 160. Therefore, when the user connects the cable 760 to the cable 764 via the quick release connector 762, the user can press (actuate) the hand brake 160 so that the brake system 735 is actuated and the brake pads 747a and 747b apply the braking pressure to the brake rotor 710. The quick release connector 762 may be similar to the quick release connectors 115a through 115e as discussed herein.

As an example, when the unit 155 is connected to the rear frame 148 in the backpack trailing mode as shown in FIG. 1, the cable 764 would be a cable running from the extended trailing section hand brake 160. Therefore, when the user connects the cable 760 to the cable 764 via the quick release connector 762, the user can press (actuate) the hand brake 160 so that the brake system 735 is actuated and the brake pads 747a and 747b apply the braking pressure to the brake rotor 710. The quick release connector 762 may be similar to the quick release connectors 115a through 115e as discussed herein, but this is not a requirement for the connector 762 (quick connect brake cable joint 762).

As an example, when the unit 155 is connected to the extension frame 125 in the front of the trailing section 110 in the scooter mode as shown in FIG. 2, the cable 764 would be a cable running from the brake lever 230 of the handle bar 220. Therefore, when the user connects the cable 760 to the cable 764 via the quick release connector 762, the user can press (actuate) the brake lever 230 so that the brake system 735 is actuated and the brake pads 747a and 747b apply the braking pressure to the brake rotor 710.

The leverage bar 754 provides a kind of teeter-toter action around the pivoting post 756. The pull from the cable 760 on the one end 758 of the leverage bar 754 in turn pushes in the brake plunger 752 on the opposite end 765 (opposite of end 758) into the master cylinder 745.

Figure 7G:
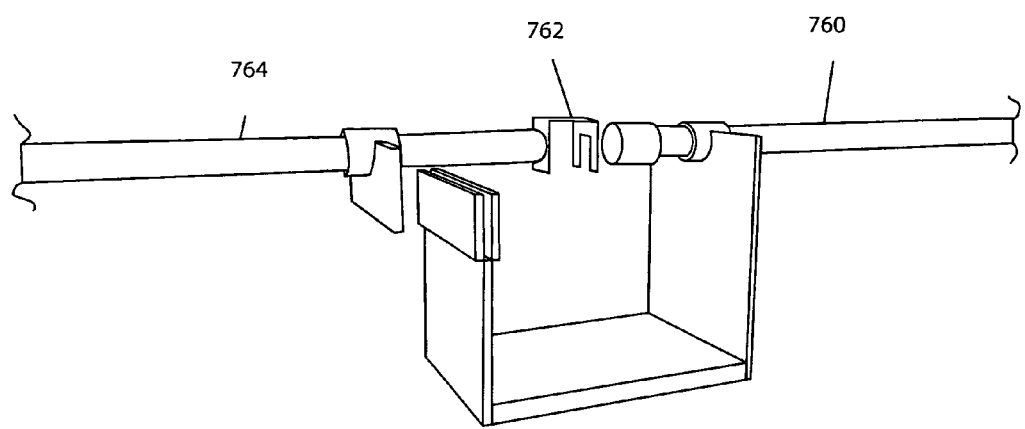
FIG. 7g is a block diagram of the quick release connector with the cables in FIG. 7f disconnected from each other, in accordance with an embodiment of the invention.
Figure 7H:
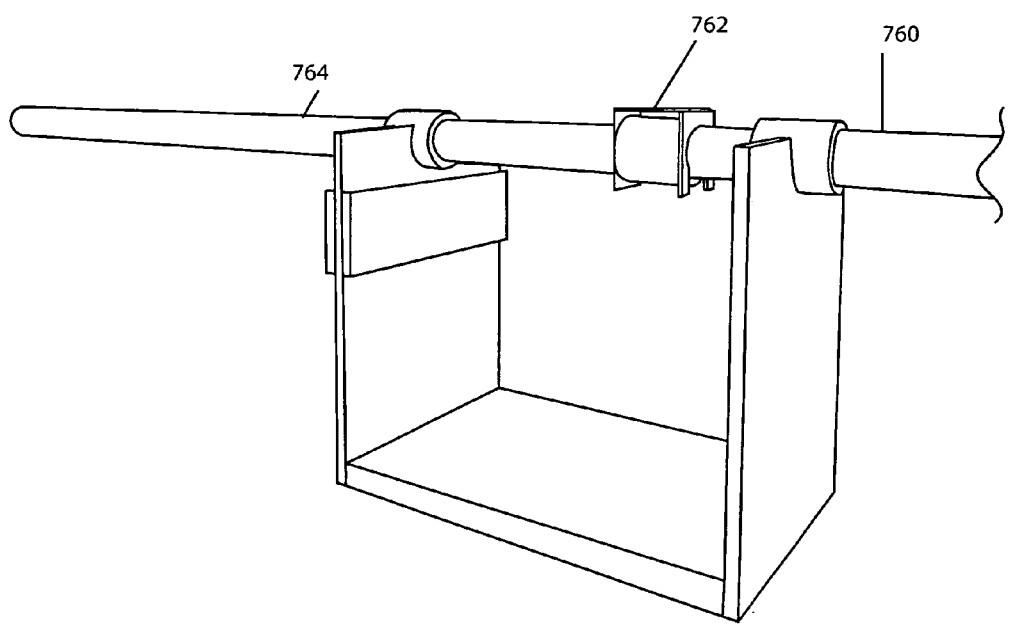
FIG. 7h is a block diagram of the quick release connector with the cables in FIG. 7f connected to each other, in accordance with an embodiment of the invention.

Reference is now made to FIGS. 7g and 7h. FIG. 7g is a block diagram of the quick release connector with the cables in FIG. 7f disconnected from each other, in accordance with an embodiment of the invention. In contrast, FIG. 7h is a block diagram of the quick release connector with the cables in FIG. 7f connected to each other, in accordance with an embodiment of the invention. Since the unit 155 is designed to be quickly removed (detached) and relocated between the rear and front of the trailing section 110, the quick connect brake cable joint 762 is able to attach a brake cable for use and for quick removal when not needed. Similar joints may be used in other suitable parts of the apparatus 100. In an embodiment, the main cable attachment body would be attached to the main housing. The cable attachment body holds the cable sheaths in line so that the cable can perform its function. There is a short section 760 of cable that connects to the leverage bar 754 and the other end has a metal cylinder (or ball) that is common with cabling elements and that is bigger around (or in diameter) to provide a catch. The other end, which is the removable part, has a cable end that loops or slips over the opposing end. The end of this cable sheath would also have a little catch plate that may just press and snap into position on the cable attachment body and maintain the connection.

Reference is now made to FIGS. 8a, 8b, 8c, 8d, 8e, 8f, 8g, 8h, and 8i which are block diagrams of various embodiments of quick couplers 115 (quick release main joints 115), in accordance with an embodiment of the invention. A coupler 115 is preferably made of a heavy duty material such as, by way of example and not by way of limitation, titanium or another heavy duty material.

A quick coupler 115 (e.g., coupler 115a) includes an outer shell 805 which the user would grip and twist in the direction 810 (with respect to the Y-axis) in order to release a beveled lower shaft 815 from the catches 820. The coupler 115 is coupled to, for example, the frame 120a. In the drawings, four catches 820a, 820b, 820c, and 820d are shown. However, the number of catches 820 may vary.

Figure 8A:
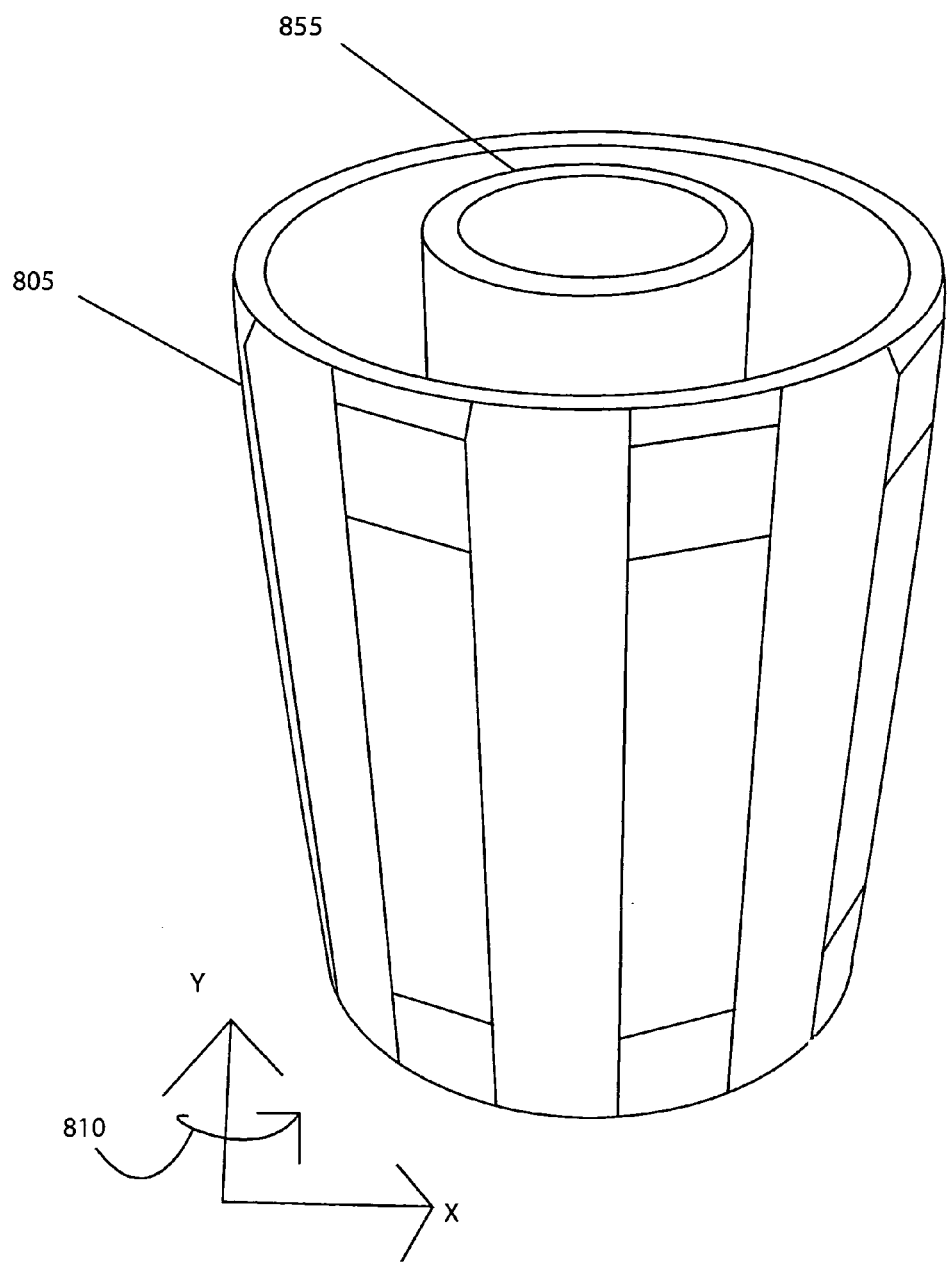
FIGS. 8*a*, 8*b*, 8*c*, 8*d*, 8*e*, 8*f*, 8*g*, 8*h*, and 8*i* are block diagrams of various embodiments of quick couplers (quick release main joints) in accordance with an embodiment of the invention.
Figure 8B:
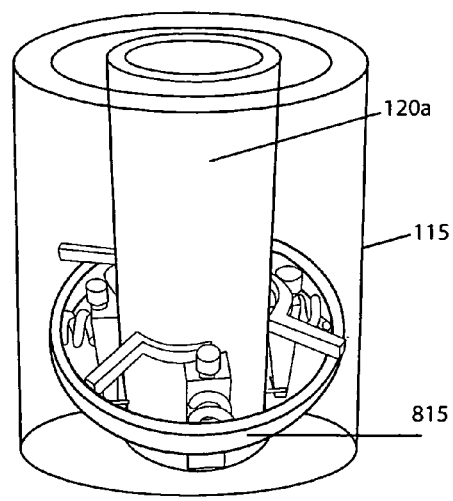
Figure 8C:
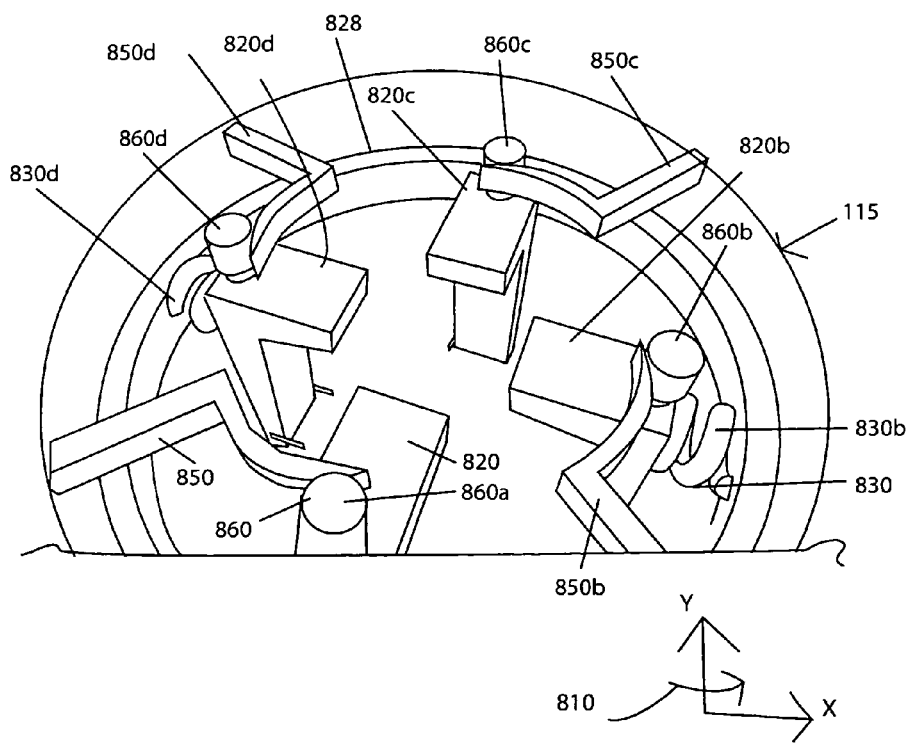
Figure 8D:
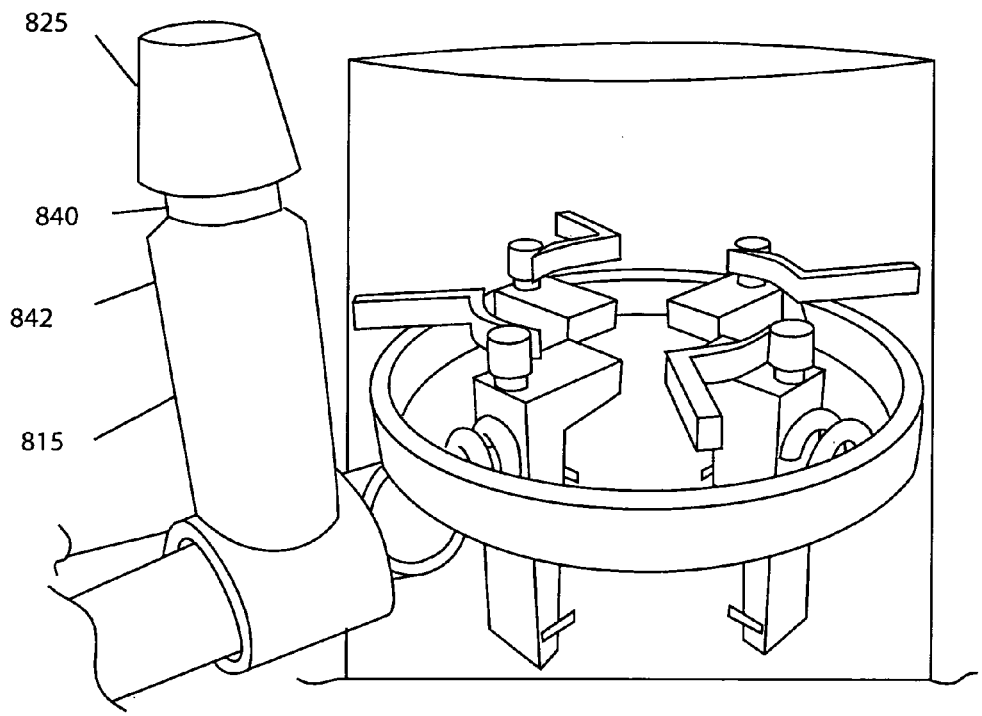
Figure 8E:
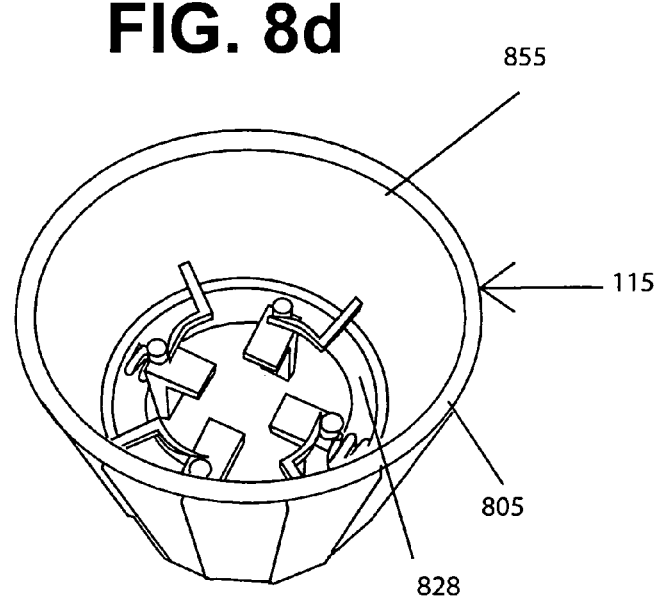
Figure 8F:
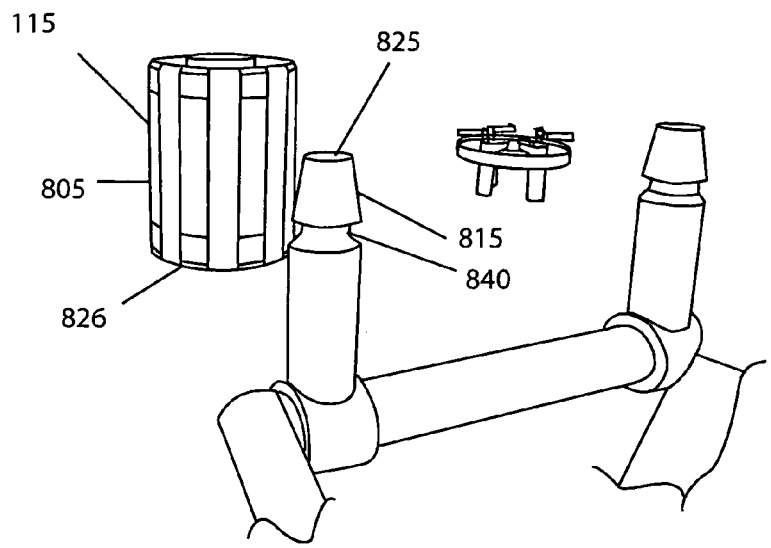
Figure 8G:
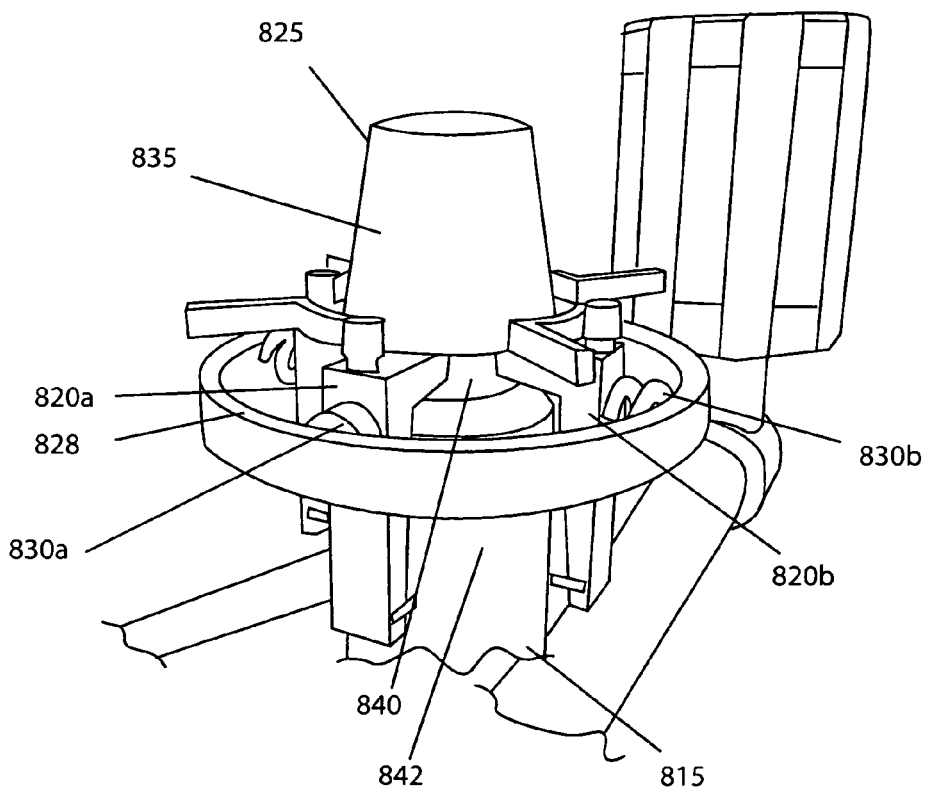
Figure 8H:
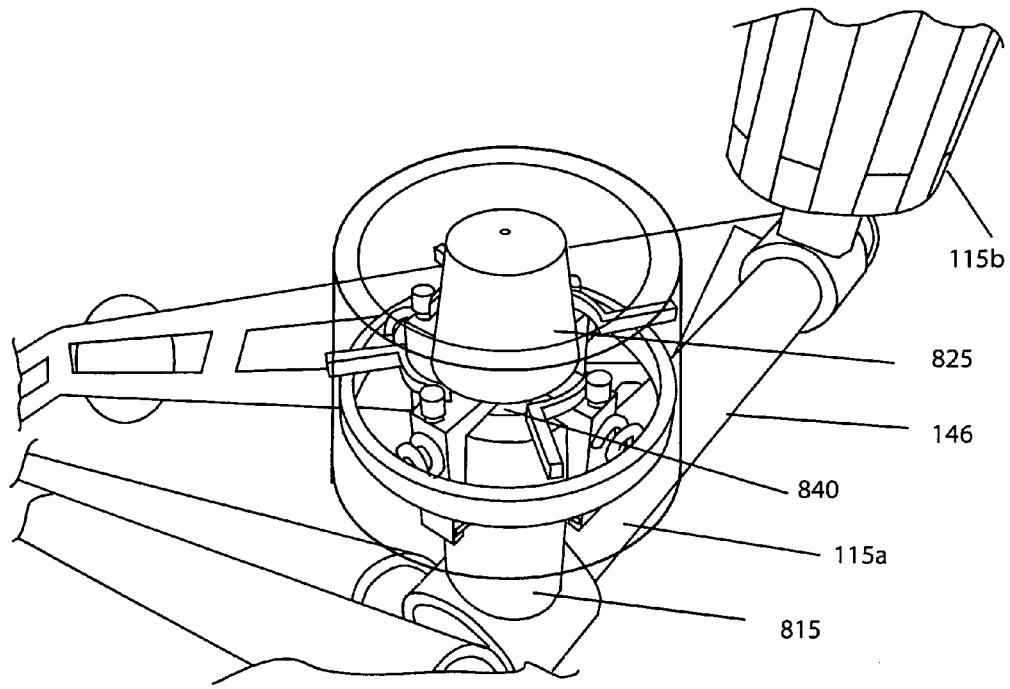
Figure 8I:
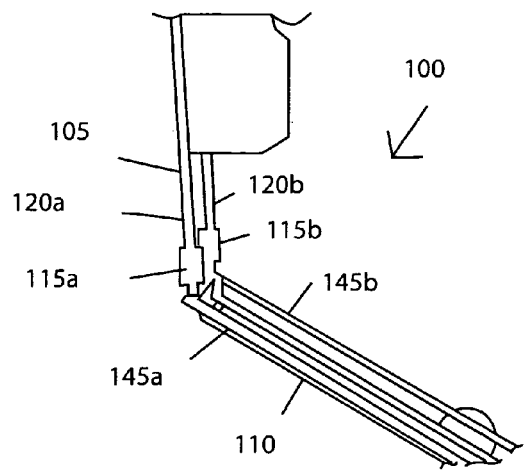

As shown in FIG. 8i, the exemplary quick couplers 115a and 115b removably couple the upper section 105 to the lower section 110 (extended trailing section 110) of the apparatus 100, in one embodiment of the invention. The first coupler 115a removably connects the first upper frame 120a of the upper section 105 to the first lower frame 145a of the lower section 110, while the second coupler 115b removably connects the second upper frame 120b of the upper section 105 to the second lower frame 145b of the lower section 110.

FIG. 8b shows a lower shaft 815 (which is, e.g., connected to a frame such as, for example, frames 145a or 145b) removably connected to a coupler 115. In contrast, FIG. 8c shows the coupler 115 that is not removably connected to a frame. FIG. 8e shows the coupler 115 as seen from the top of the outer shell 805 without any shafts 815 connected to the coupler 115.

To connect a shaft 815 to the coupler 115, a beveled top portion 825 (FIG. 8f) is inserted through the bottom 826 of the coupler 115. The beveled top portion 825 is inserted between and within the catches 820a through 820d. The catches 820a through 820d will push back to the inner wall 828 of the coupler 115 because the catches 820 are movable due to the springs 830 that connect the catches 820 to the inner wall 828. For example, FIG. 8c shows the spring 830b connecting the catch 820b to the inner wall 828 and the spring 830d connecting the catch 820d to the inner wall 828. FIG. 8g shows the spring 830a connecting the catch 820a to the inner wall 828. The beveled shape 835 (FIG. 8g) of the portion 825 will insert through the catches 820, and the catches 820 will lock into the indentation 840 (groove 840) between the top portion 825 and lower portion 842 of the shaft 815. As a result, the shaft 815 is securely locked with the coupler 115. It is noted that FIG. 8g shows the outer shell 805 in wireframe format for ease of discussion.

To disconnect the shaft 815 from the coupler 115, the user turns or twists the housing 805 in the direction 810 with respect to the Y axis (FIG. 8a). This rotation direction 810 will cause the L-shaped members 850 to also rotate in the rotation direction. The L-shape members are coupled to the inner wall 855 (FIG. 8a) of the outer shell 805. The number of L-shaped members 850a may vary. In the example of FIG. 8c, the L-shaped members 850a, 850b, 850c, and 850d are shown. When the L-shaped members 850 are rotated in the rotation direction 810, the L-shaped members 850a, 850b, 850c, and 850d will latch with or come into contact with the rollers 860a, 860b, 860c, and 860d, respectively. The rollers 860a, 860b, 860c, and 860d are coupled to the catches 820a, 820b, 820c, and 820d, respectively. When the L-shaped members 850 latches to the rollers 860, the L-shaped members 850 will push back the catches 820 against the inner wall 828 and against the force of the springs 830. As a result, the catches 820 will be removed from the groove 840 and the user will be able to disconnect the shaft 815 from the quick release coupler 115 (quick release main joint 115) and the user can separate the frame 145a from the frame 120a and can separate the frame 145b from the frame 120b. The L-shaped units 850 are not restrictive and could also be represented as a plate with angular type of slots that would be mounted also to hand grip unit 805 as to serve the same purpose as expressed about to press against rollers 860a-d as to release the mechanism. This plate (not shown) would be intended for structural integrity as the L-shaped units 850a-d in FIG. 8c may not be adequate for pressures involved but serve to demonstrate action.

FIGS. 9a, 9b, 9d, and 9e are block diagrams of various embodiments of shoulder straps in accordance with an embodiment of the invention. Each of the shoulder straps 900a, 900b, 900c, 900d, and 900e mount in centralized areas 905a, 905b, 905c, 905d, and 905e respectively, and are each designed to quickly release either by a latch or a cam lock system. The straps 900a-900e can be used instead of the straps 130a and 130b (FIG. 1) for the apparatus 100. All of the straps 910 can be removably attached together and each strap 910 can be adjusted to basically provide a tight fit against the back support to help the back of the user as well as having better control with the body movements of the user, as well as an option to release the straps 910 to permit the user to disengage the straps 910 in an emergency, especially if devise every used for military applications. Some of these drawings show a fifth connection point or a submarine belt, which is basically a down facing belt, and this connection point would not typically be considered or used for a backpack, since a backpack user is not sitting on a racing seat.

Figure 9A:
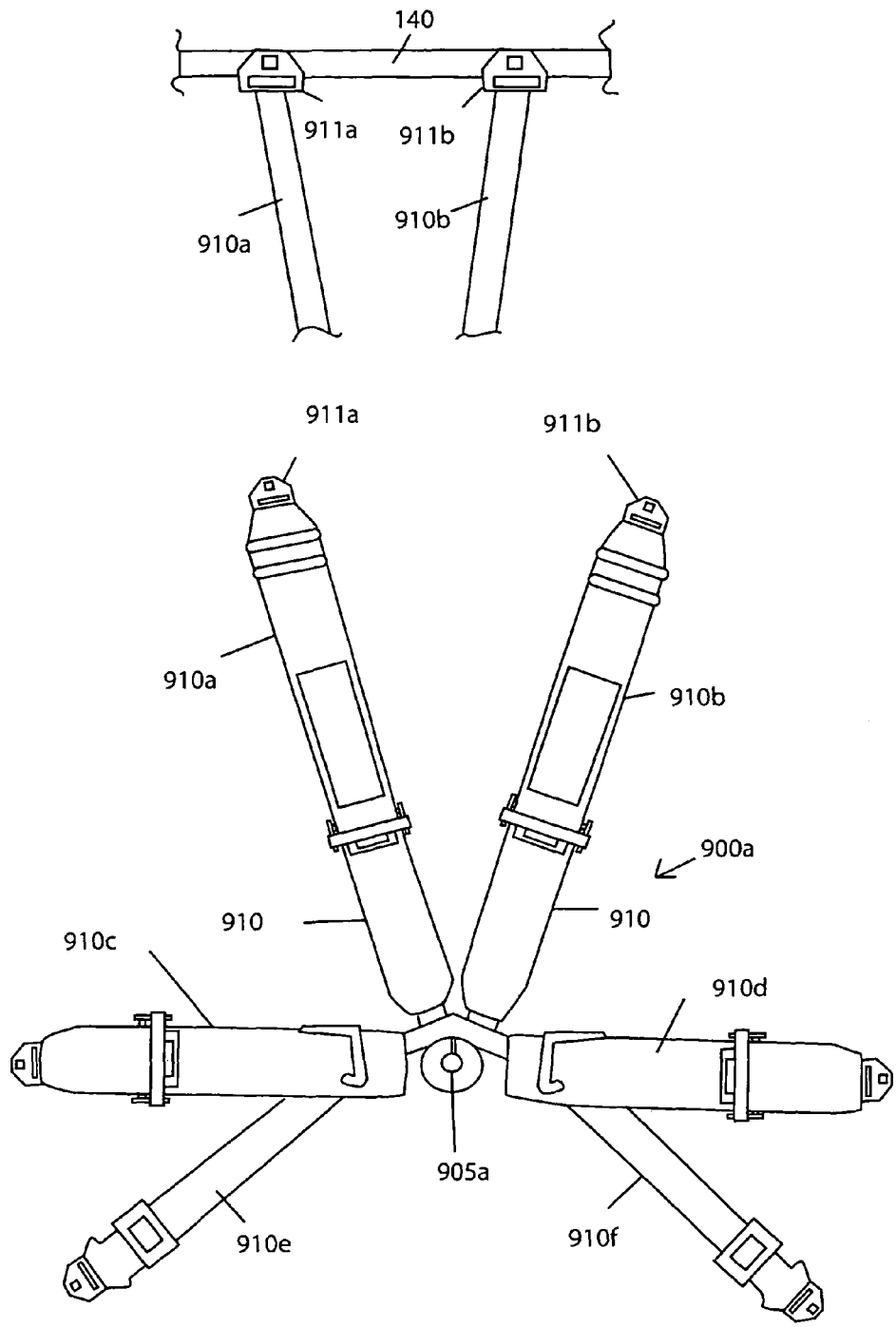
FIGS. 9*a*, 9*b*, 9*c*, 9*d*, and 9*e* are block diagrams of various embodiments of shoulder straps in accordance with an embodiment of the invention.
Figure 9B:
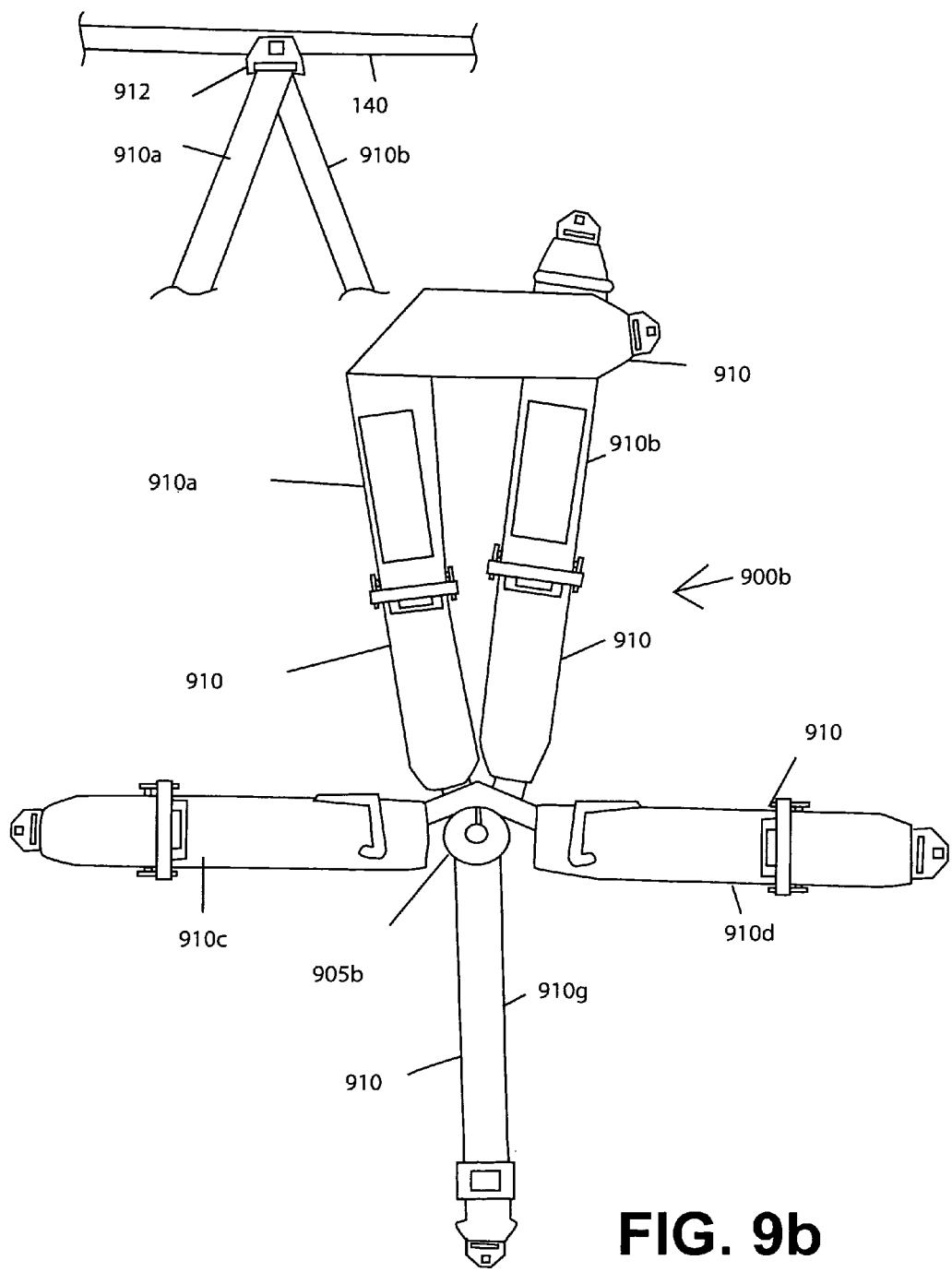
Figure 9C:
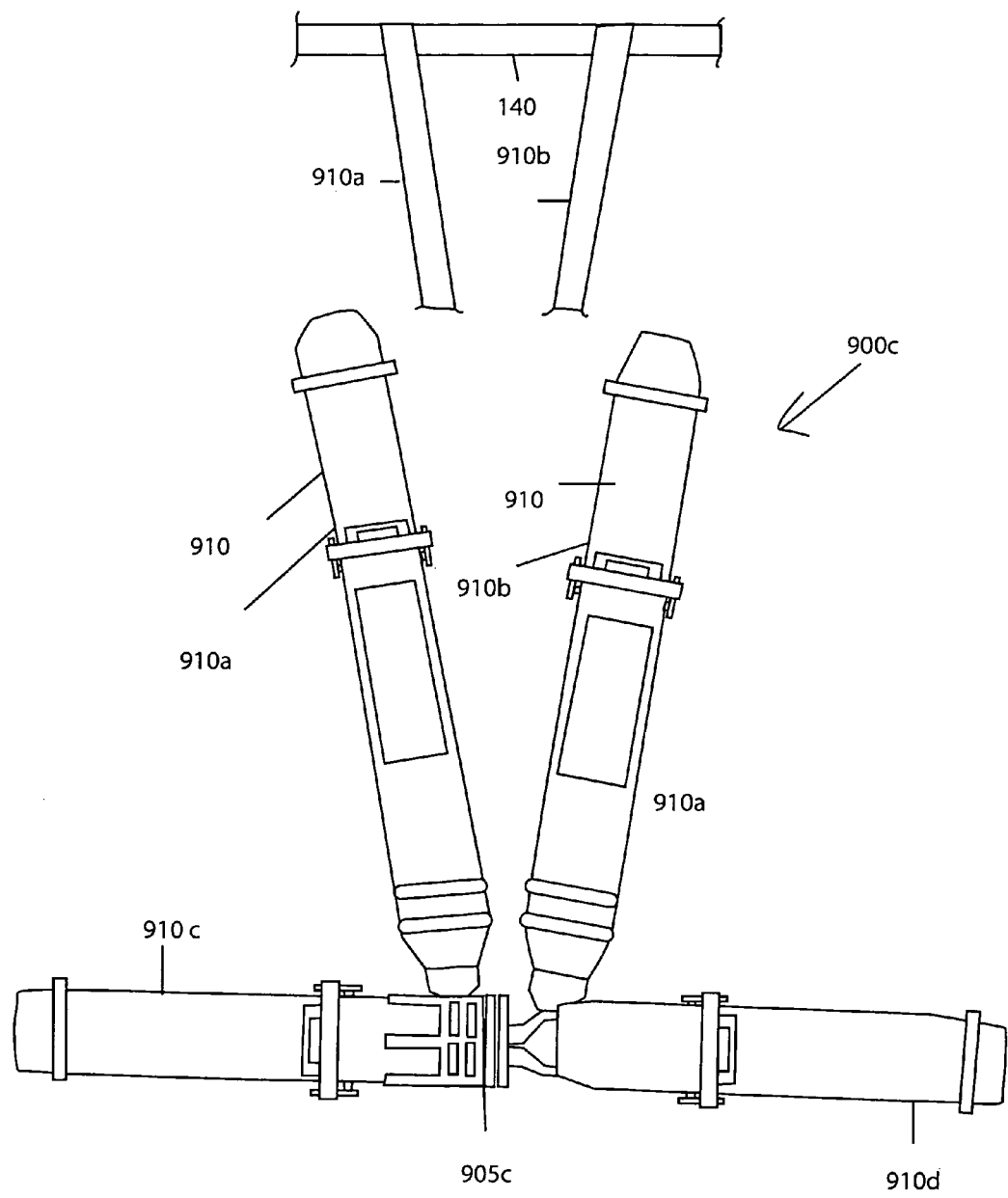
Figure 9D:
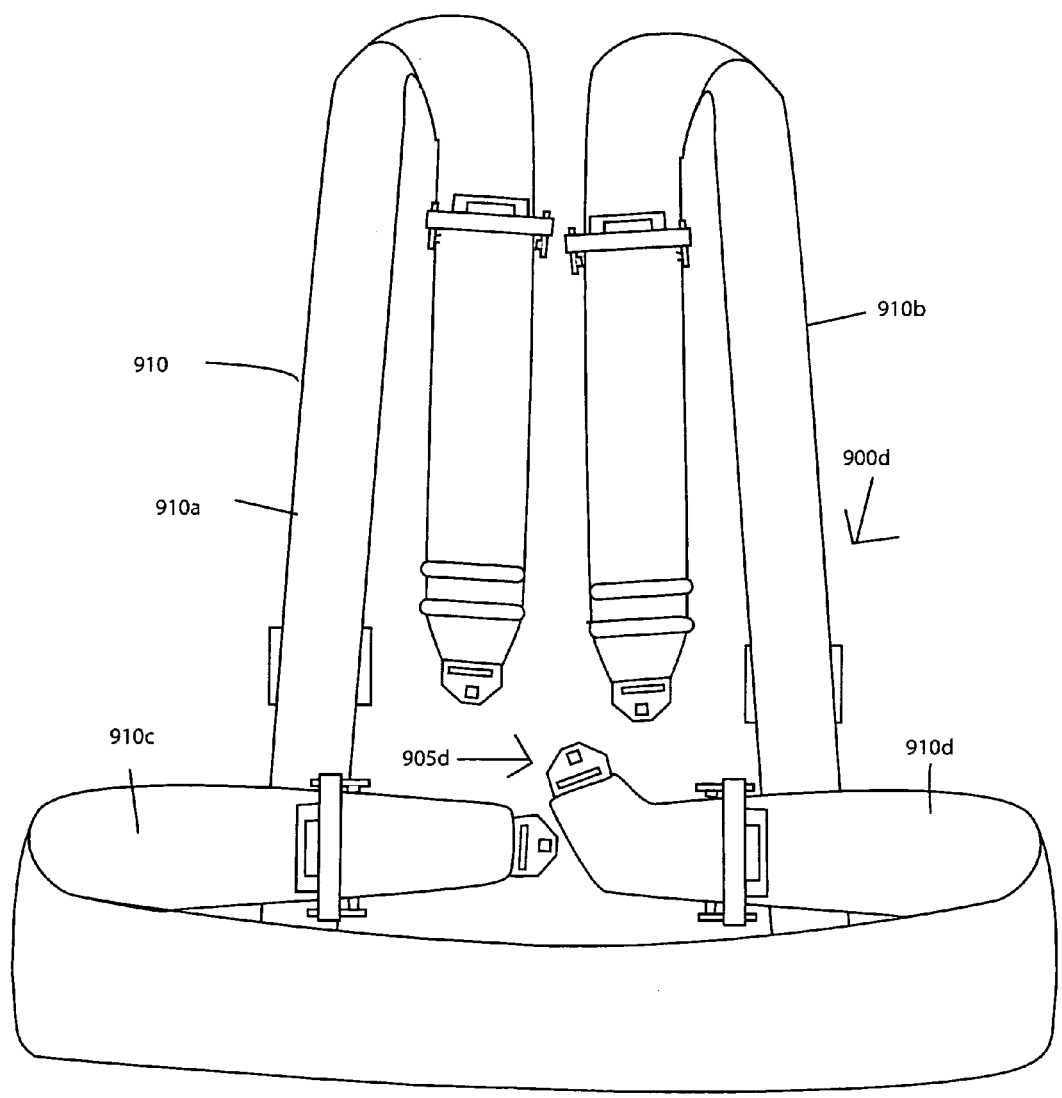
Figure 9E:
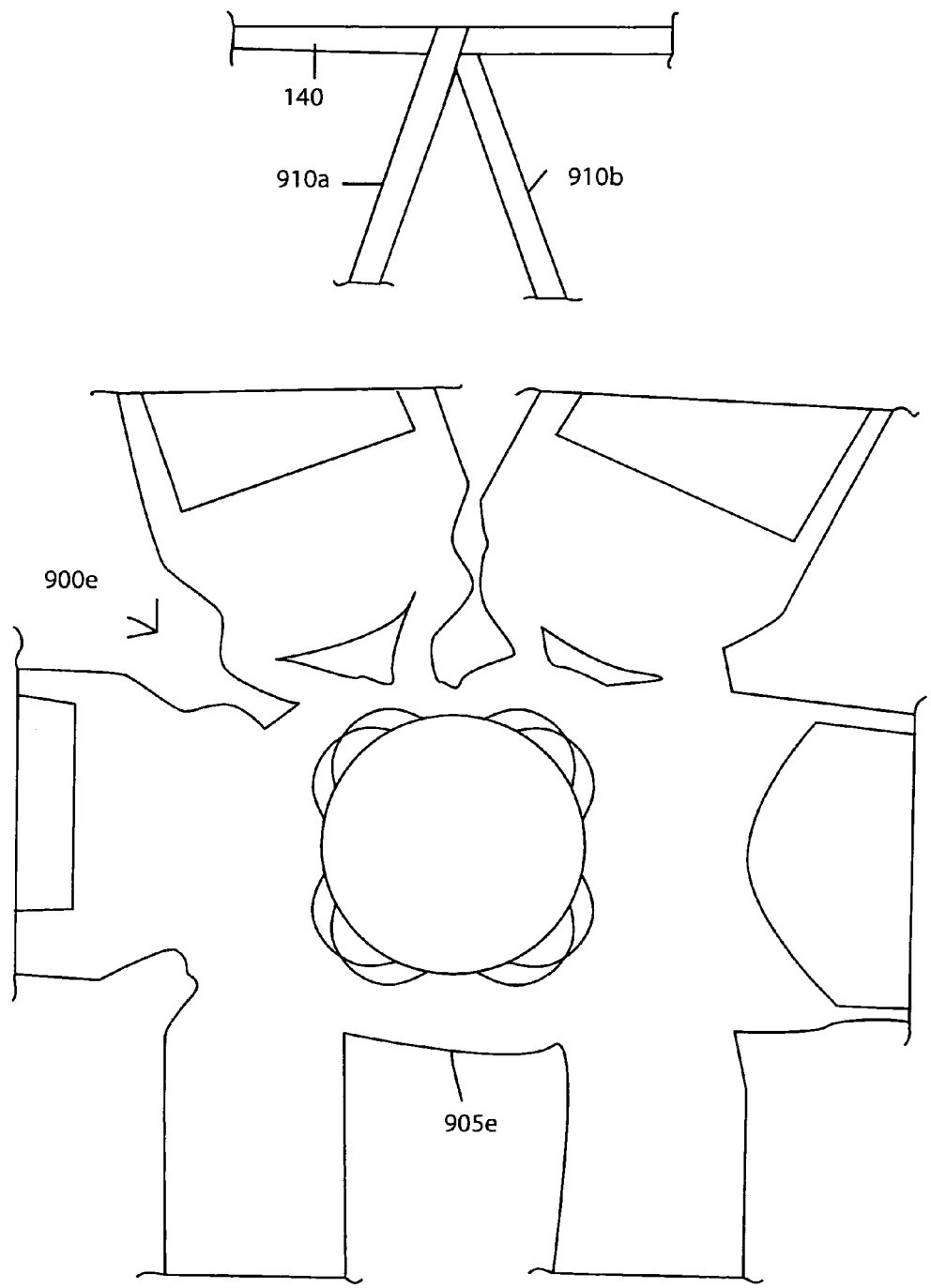

In FIG. 1, the straps 910a and 910b can be bolt-in (or otherwise attached) to the pad 140 by use of the bolts (or connectors) 911a and 911b, respectively, where the straps 910a and 910b are attached in separate areas in the pad 140. The shoulder trap 900a may include other straps such as, for example, waste straps 910c and 910d where both straps 910c and 910d are attached to the centralized area 905a, and lower straps 9103 and 910f. In FIG. 9b, the straps 910a and 910b can be bolt-in (or otherwise attached) to the pad 140 by use of a bolt (or connector) 912, where the straps 910a and 910b are attached in the pad 140 by connector 912. The shoulder strap 900b may also include a bottom strap 910g attached to the centralized area 905b. In FIG. 9C, the straps 910a and 910b are wrapped around the pad 140 in separate areas on the pad 140. FIG. 9d is a block diagram of another shoulder strap 900d that wraps around the pad 140. In FIG. 9e, the straps 910a and 910b are wrapped around the pad 140 in the same area of the pad 140.

Figure 10:
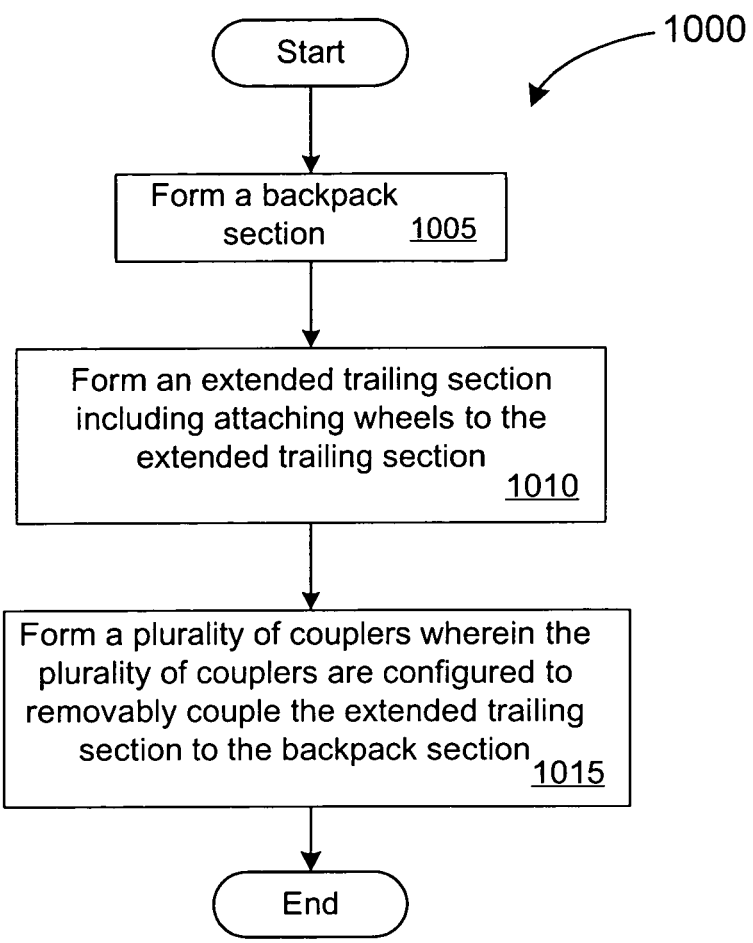
FIG. 10 is a flow diagram of a method for assembling a multiple mode portable wheeled backpack, in accordance with an embodiment of the invention.

FIG. 10 is a flow diagram of a method 1000 for assembling a multiple mode portable wheeled backpack, in accordance with an embodiment of the invention. The blocks in method (and/or steps in the blocks in method) may vary in order or sequence than those shown in the drawing. For example, the steps in three blocks may be switched in sequence or order.

In the first block 1005, a backpack section is formed. In the second block 1010, an extended trailing section is formed including attaching wheels to the extended trailing section. In the third block 1015, a plurality of couplers are formed, wherein the plurality of couplers are configured to removably couple the extended trailing section to the backpack section. Additional steps in the method may be added as previously discussed above.

Other variations and modifications of the above-described embodiments and methods are possible in light of the teaching discussed herein. The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A multiple mode portable wheeled backpack comprising:
   a backpack section comprising a first vertical frame member, a second vertical frame member, a top frame member that is between and that is connected to the first vertical frame member and second vertical frame member, and a third frame member that is between and that is connected to the first vertical frame member and second vertical frame member; and
   an extended trailing section that is removably coupled to the backpack section, the extended trailing section comprising a first frame member, a second frame member, a rear frame member that is between and that is connected to the first frame member and second frame member, and a front frame member that is between and that is connected to the first frame member and second frame member;
   wherein the extended trailing section includes a plurality of wheels comprising a left auxiliary wheel and a right auxiliary wheel;
   a steering and brake assembly unit comprising a housing, a rear primary wheel, and a brake system coupled to the rear primary wheel;
   a first hand brake controller coupled to the extended trailing section;
   a steering handle comprising at least one grip and a second hand brake controller coupled to the at least one grip;
   a plurality of quick release couplers including a first quick release coupler, a second quick release coupler, a third quick release coupler, a fourth quick release coupler, and a fifth quick release coupler;
   wherein the first vertical frame member of the backpack section and the first frame member of the extended trailing section are removably coupled via the first quick release coupler;
   wherein the second vertical frame member of the backpack section and the second frame member of the extended trailing section are removably coupled via the second quick release coupler;
   wherein the steering and brake assembly unit and the third frame member of the backpack section are removably coupled via the third quick release coupler in a backpack trailing mode, the steering and brake assembly unit including the housing, rear primary wheel, and brake system;
   wherein the steering handle and the top frame member of the backpack section are removably coupled via the fourth quick release coupler in the backpack trailing mode;
   wherein the second hand brake controller is removably coupled to the brake system in the backpack trailing mode; and
   wherein the steering and brake assembly unit and the rear frame member of the extended trailing section are removably coupled via the fifth quick release coupler in a passenger mode, the steering and brake assembly unit including the housing, rear primary wheel, and brake system;
   wherein the first hand brake controller is removably coupled to the brake system in the passenger mode.

2. The portable wheeled backpack of claim 1, wherein any one of the plurality of quick release couplers comprises: an outer shell, a plurality of catches for receiving an indentation of a shaft, wherein each one of the catches are coupled to an inner wall of the outer shell by a corresponding spring, and a plurality of shaped members coupled to the inner wall and a plurality of rollers, each one of the rollers coupled to an associated one of the catches, wherein each one of the shaped members latches with an associated one of the rollers.

3. The wheeled backpack of claim 1, further comprising an engine removably coupled to the extendable trailing section.

4. The wheeled backpack of claim 1, further comprising a backpack cargo removably coupled to the backpack section.

5. The wheeled backpack of claim 1, further comprising a cargo box removably coupled to the extended trailing section.

6. A multiple mode portable wheeled backpack comprising:
- means for a backpack section comprising a first vertical frame member, a second vertical frame member, a top frame member that is between and that is connected to the first vertical frame member and second vertical frame member, and a third frame member that is between and that is connected to the first vertical frame member and second vertical frame member; and
- means for an extended trailing section that is removably coupled to the backpack section means, wherein the extended trailing section means, the extended trailing section means comprising a first frame member, a second frame member, a rear frame member that is between and that is connected to the first frame member and second frame member, and a front frame member that is between and that is connected to the first frame member and second frame member;
- wherein the extended trailing section means includes a plurality of wheels comprising a left auxiliary wheel and a right auxiliary wheel;
- a steering and brake assembly unit comprising a housing, a rear primary wheel, and a brake system coupled to the rear primary wheel;
- a first hand brake controller coupled to the extended trailing section means;
- a steering handle comprising at least one grip and a second hand brake controller coupled to the at least one grip;
- a plurality of quick release couplers including a first quick release coupler, a second quick release coupler, a third quick release coupler, a fourth quick release coupler, and a fifth quick release coupler;
- wherein the first vertical frame member of the backpack section means and the first frame member of the extended trailing section means are removably coupled via the first quick release coupler;
- wherein the second vertical frame member of the backpack section means and the second frame member of the extended trailing section means are removably coupled via the second quick release coupler;
- wherein the steering and brake assembly unit and the third frame member of the backpack section means are removably coupled via the third quick release coupler in a backpack trailing mode, the steering and brake assembly unit including the housing, rear primary wheel, and brake system;
- wherein the steering handle and the top frame member of the backpack section means are removably coupled via the fourth quick release coupler in the backpack trailing mode;
- wherein the second hand brake controller is removably coupled to the brake system in the backpack trailing mode; and
- wherein the steering and brake assembly unit and the rear frame member of the extended trailing section means are removably coupled via the fifth quick release coupler in a passenger mode, the steering and brake assembly unit including the housing, rear primary wheel, and brake system;
- wherein the first hand brake controller is removably coupled to the brake system in the passenger mode.

7. The wheeled backpack of claim 6, wherein any one of the plurality of quick release couplers comprises: an outer shell, a plurality of catches for receiving an indentation of a shaft, wherein each one of the catches are coupled to an inner wall of the outer shell by a corresponding spring, and a plurality of shaped members coupled to the inner wall and a plurality of rollers, each one of the rollers coupled to an associated one of the catches, wherein each one of the shaped members latches with an associated one of the rollers.

8. The wheeled backpack of claim 6, wherein the wheeled backpack is configured in a motorized mode.

9. A method of assembling a multiple mode portable wheeled backpack, the method comprising:
- forming a backpack section comprising a first vertical frame member, a second vertical frame member, a top frame member that is between and that is connected to the first vertical frame member and second vertical frame member, and a third frame member that is between and that is connected to the first vertical frame member and second vertical frame member;
- forming an extended trailing section that is removably coupled to the backpack section, the extended trailing section comprising a first frame member, a second frame member, a rear frame member that is between and that is connected to the first frame member and second frame member, and a front frame member that is between and that is connected to the first frame member and second frame member;
- wherein the extended trailing section includes a plurality of wheels comprising a left auxiliary wheel and a right auxiliary wheel;
- forming a steering and brake assembly unit comprising a housing, a rear primary wheel, and a brake system coupled to the rear primary wheel;
- forming a first hand brake controller coupled to the extended trailing section;
- forming a steering handle comprising at least one grip and a second hand brake controller coupled to the at least one grip;
- forming a plurality of quick release couplers including a first quick release coupler, a second quick release coupler, a third quick release coupler, a fourth quick release coupler, and a fifth quick release coupler;
- wherein the first vertical frame member of the backpack section and the first frame member of the extended trailing section are removably coupled via the first quick release coupler;
- wherein the second vertical frame member of the backpack section and the second frame member of the extended trailing section are removably coupled via the second quick release coupler;
- wherein the steering and brake assembly unit and the third frame member of the backpack section are removably coupled via the third quick release coupler in a backpack trailing mode, the steering and brake assembly unit including the housing, wheel, and brake system;
- wherein the steering handle and the top frame member of the backpack section are removably coupled via the fourth quick release coupler in the backpack trailing mode;

wherein the second hand brake controller is removably coupled to the brake system in the backpack trailing mode; and wherein the steering and brake assembly unit and the rear frame member of the extended trailing section are removably coupled via the fifth quick release coupler in a passenger mode, the steering and brake assembly unit including the housing, wheel, and brake system;

wherein the first hand brake controller is removably coupled to the brake system in the passenger mode.

10. The method of claim 9, wherein any one of the plurality of quick release couplers comprises: an outer shell, a plurality of catches for receiving an indentation of a shaft, wherein each one of the catches are coupled to an inner wall of the outer shell by a corresponding spring, and a plurality of shaped members coupled to the inner wall and a plurality of rollers, each one of the rollers coupled to an associated one of the catches, wherein each one of the shaped members latches with an associated one of the rollers.

* * * * *